United States Patent
Koval

(10) Patent No.: US 12,260,078 B2
(45) Date of Patent: Mar. 25, 2025

(54) DYNAMIC WEBPAGE INTERFACE FOR AN INTELLIGENT ELECTRONIC DEVICE

(71) Applicant: EI ELECTRONICS LLC, Westbury, NY (US)

(72) Inventor: Luna A. Koval, Commack, NY (US)

(73) Assignee: EI ELECTRONICS LLC, Westbury, NY (US)

( * ) Notice: Subject to any disclaimer, the term of this patent is extended or adjusted under 35 U.S.C. 154(b) by 495 days.

(21) Appl. No.: 14/742,302

(22) Filed: Jun. 17, 2015

(65) Prior Publication Data

US 2015/0286394 A1    Oct. 8, 2015

Related U.S. Application Data

(63) Continuation-in-part of application No. 13/831,708, filed on Mar. 15, 2013, now Pat. No. 10,275,840,
(Continued)

(51) Int. Cl.
*G06F 3/04847* (2022.01)
*G01D 4/00* (2006.01)
(Continued)

(52) U.S. Cl.
CPC ......... *G06F 3/04847* (2013.01); *G01D 4/004* (2013.01); *G06F 16/957* (2019.01);
(Continued)

(58) Field of Classification Search
CPC ..... G01D 4/002; H02J 13/0075; H02J 13/001
(Continued)

(56) References Cited

U.S. PATENT DOCUMENTS

| | | |
|---|---|---|
| 2,883,255 A | 4/1959 | Anderson |
| 2,987,704 A | 6/1961 | Gimpel et al. |
| | (Continued) | |

FOREIGN PATENT DOCUMENTS

| | | |
|---|---|---|
| CN | 101799681 A | 8/2010 |
| CN | 111444240 A | 7/2020 |
| | (Continued) | |

OTHER PUBLICATIONS

Crockford, Douglas, "https://web.archive.org/web/20030621080211/http://www.crockford.com/javascript/jsmin.html", Oct. 28, 2002.*
(Continued)

*Primary Examiner* — Alicia M. Choi
*Assistant Examiner* — Vi N Tran
(74) *Attorney, Agent, or Firm* — Robinson + Cole LLP

(57) ABSTRACT

A dynamic webpage interface for an intelligent electronic device (IED) and method thereof are provided. The present disclosure provides for separating a webpage into multiple discrete resources, and to customize the resources returned by a web server based on the contents of a request. In one embodiment, such a custom request is implemented by a Web Services interface, such as content based API's like SOAP (Simple Object Access Protocol), or address and command based API's like REST (Representational State Transfer). In another embodiment, such a custom request may also be implemented by server side processing, such as CGI (Common Gateway Interface), PHP (Hypertext Preprocessor), or other server side engines.

32 Claims, 9 Drawing Sheets

Related U.S. Application Data which is a continuation-in-part of application No. 13/644,877, filed on Oct. 4, 2012, now abandoned.

(60) Provisional application No. 62/013,091, filed on Jun. 17, 2014, provisional application No. 61/542,935, filed on Oct. 4, 2011.

(51) Int. Cl.

| | |
|---|---|
| G06F 16/957 | (2019.01) |
| G06Q 10/06 | (2023.01) |
| G06Q 50/06 | (2024.01) |
| H04B 3/54 | (2006.01) |
| H04L 9/40 | (2022.01) |
| H04L 43/08 | (2022.01) |
| H04L 67/02 | (2022.01) |
| H04L 67/06 | (2022.01) |
| H04L 69/00 | (2022.01) |
| H04W 4/38 | (2018.01) |
| G01R 1/02 | (2006.01) |
| G01R 19/25 | (2006.01) |
| G01R 22/06 | (2006.01) |

(52) U.S. Cl.
CPC ............. *G06Q 10/06* (2013.01); *G06Q 50/06* (2013.01); *H04B 3/542* (2013.01); *H04L 43/08* (2013.01); *H04L 63/0823* (2013.01); *H04L 67/02* (2013.01); *H04L 67/06* (2013.01); *H04L 69/03* (2013.01); *H04W 4/38* (2018.02); *G01R 1/025* (2013.01); *G01R 19/2513* (2013.01); *G01R 22/063* (2013.01); *Y02B 90/20* (2013.01); *Y04S 20/30* (2013.01)

(58) Field of Classification Search
USPC .......................................... 340/870; 700/295
See application file for complete search history.

(56) References Cited

U.S. PATENT DOCUMENTS

| | | | |
|---|---|---|---|
| 3,142,820 A | 7/1964 | Daniels | |
| 3,453,540 A | 7/1969 | Dusheck, Jr. | |
| 3,824,441 A | 7/1974 | Heyman et al. | |
| 4,246,623 A | 1/1981 | Sun | |
| 4,466,071 A | 8/1984 | Russell | |
| 4,489,386 A | 12/1984 | Breddan | |
| 4,884,021 A | 11/1989 | Hammond et al. | |
| 4,996,646 A | 2/1991 | Farrington | |
| 5,014,229 A | 5/1991 | Mofachern | |
| 5,166,887 A | 11/1992 | Farrington et al. | |
| 5,170,360 A | 12/1992 | Porter et al. | |
| 5,185,705 A | 2/1993 | Farrington | |
| 5,212,441 A | 5/1993 | McEachern et al. | |
| 5,224,054 A | 6/1993 | Wallis | |
| 5,233,538 A | 8/1993 | Wallis | |
| 5,237,511 A | 8/1993 | Caird et al. | |
| 5,298,854 A | 3/1994 | McEachern et al. | |
| 5,298,855 A | 3/1994 | McEachern et al. | |
| 5,298,856 A | 3/1994 | McEachern et al. | |
| 5,298,859 A | 3/1994 | McEachern et al. | |
| 5,298,885 A | 3/1994 | McEachern et al. | |
| 5,298,888 A | 3/1994 | McEachern et al. | |
| 5,300,924 A | 4/1994 | McEachern et al. | |
| 5,301,122 A | 4/1994 | Halpern | |
| 5,302,890 A | 4/1994 | McEachern et al. | |
| 5,307,009 A | 4/1994 | McEachern et al. | |
| 5,315,527 A | 5/1994 | Beckwith | |
| 5,347,464 A | 9/1994 | McEachern et al. | |
| 5,544,064 A | 8/1996 | Beckwith | |
| 5,559,719 A | 9/1996 | Johnson et al. | |
| 5,574,654 A | 11/1996 | Bingham et al. | |
| 5,581,173 A | 12/1996 | Yalla et al. | |
| 5,706,204 A | 1/1998 | Cox et al. | |
| 5,724,556 A | 3/1998 | Souder et al. | |
| 5,764,523 A | 6/1998 | Yoshinaga et al. | |
| 5,774,366 A | 6/1998 | Beckwith | |
| 5,796,977 A | 8/1998 | Sarangdhar et al. | |
| 5,801,643 A | 9/1998 | Williams et al. | |
| 5,819,203 A | 10/1998 | Moore et al. | |
| 5,822,165 A | 10/1998 | Moran | |
| 5,832,210 A | 11/1998 | Akiyama et al. | |
| 5,874,903 A | 2/1999 | Shuey et al. | |
| 5,898,387 A | 4/1999 | Davis et al. | |
| 5,899,960 A | 5/1999 | Moore et al. | |
| 5,986,574 A | 11/1999 | Colton | |
| 6,018,690 A | 1/2000 | Saito et al. | |
| 6,028,857 A | 2/2000 | Poor | |
| 6,038,516 A | 3/2000 | Alexander et al. | |
| 6,073,169 A | 6/2000 | Shuey et al. | |
| 6,098,175 A | 8/2000 | Lee | |
| 6,100,817 A | 8/2000 | Mason, Jr. et al. | |
| 6,121,593 A | 9/2000 | Mansbery et al. | |
| 6,151,653 A | 11/2000 | Lin et al. | |
| 6,157,329 A | 12/2000 | Lee et al. | |
| 6,167,329 A | 12/2000 | Engel et al. | |
| 6,195,614 B1 | 2/2001 | Kochan | |
| 6,279,037 B1 | 8/2001 | Tams et al. | |
| 6,289,267 B1 | 9/2001 | Alexander et al. | |
| 6,343,299 B1 | 1/2002 | Huang et al. | |
| 6,393,458 B1 | 5/2002 | Gigliotti et al. | |
| 6,396,839 B1 | 5/2002 | Ardalan et al. | |
| 6,405,128 B1 | 6/2002 | Bechtolsheim et al. | |
| 6,437,692 B1 | 8/2002 | Petite et al. | |
| 6,487,457 B1 | 11/2002 | Hull et al. | |
| 6,493,644 B1 | 12/2002 | Jonker et al. | |
| 6,496,511 B1 | 12/2002 | Wang et al. | |
| 6,519,537 B1 | 2/2003 | Yang | |
| 6,528,957 B1 | 3/2003 | Luchaco | |
| 6,560,608 B1 | 5/2003 | Tomm et al. | |
| 6,564,332 B1 | 5/2003 | Nguyen et al. | |
| 6,565,608 B1 | 5/2003 | Fein et al. | |
| 6,615,147 B1 | 9/2003 | Jonker et al. | |
| 6,636,030 B1 | 10/2003 | Rose et al. | |
| 6,657,552 B2 | 12/2003 | Belski et al. | |
| 6,671,654 B1 | 12/2003 | Forth et al. | |
| 6,671,802 B1 | 12/2003 | Ott | |
| 6,717,394 B2 | 4/2004 | Elms | |
| 6,735,535 B1 | 5/2004 | Kagan et al. | |
| 6,751,563 B2 | 6/2004 | Spanier et al. | |
| 6,836,737 B2 | 12/2004 | Petite et al. | |
| 6,842,707 B2 | 1/2005 | Raichle et al. | |
| 6,900,738 B2 | 5/2005 | Crichlow | |
| 6,904,385 B1 | 6/2005 | Budike | |
| 6,957,158 B1 | 10/2005 | Hancock et al. | |
| 6,972,364 B2 | 12/2005 | Diedrichsen | |
| 6,985,087 B2 | 1/2006 | Soliman | |
| 7,006,934 B2 | 2/2006 | Jonker et al. | |
| 7,010,438 B2 | 3/2006 | Hancock et al. | |
| 7,043,459 B2 | 5/2006 | Peevey | |
| 7,049,975 B2 | 5/2006 | Vanderah et al. | |
| 7,050,808 B2 | 5/2006 | Janusz et al. | |
| 7,072,779 B2 | 7/2006 | Hancock et al. | |
| 7,085,824 B2 | 8/2006 | Forth et al. | |
| 7,085,938 B1 * | 8/2006 | Pozzuoli | H02H 1/0061 361/80 |
| 7,126,493 B2 | 10/2006 | Junker et al. | |
| 7,129,848 B2 | 10/2006 | Milliot et al. | |
| 7,203,319 B2 | 4/2007 | Ben-Zur et al. | |
| 7,243,050 B2 | 7/2007 | Armstrong | |
| 7,249,265 B2 | 7/2007 | Carolsfeld et al. | |
| 7,271,996 B2 | 9/2007 | Kagan et al. | |
| 7,299,308 B2 | 11/2007 | Kondo et al. | |
| 7,304,586 B2 | 12/2007 | Wang et al. | |
| 7,337,081 B1 | 2/2008 | Kagan | |
| 7,342,507 B2 | 3/2008 | Jonker et al. | |
| 7,436,687 B2 | 10/2008 | Patel | |
| 7,444,454 B2 | 10/2008 | Yancey et al. | |
| 7,511,468 B2 | 3/2009 | McEachern et al. | |
| 7,514,907 B2 | 4/2009 | Rajda et al. | |
| 7,519,684 B2 * | 4/2009 | Backhouse | G06F 16/958 709/219 |

(56) References Cited

U.S. PATENT DOCUMENTS

| | | |
|---|---|---|
| 7,616,656 B2 | 11/2009 | Wang et al. |
| 7,668,663 B2 | 2/2010 | Kurnik et al. |
| 7,702,779 B1 | 4/2010 | Gupta et al. |
| 7,739,728 B1 | 6/2010 | Koehler et al. |
| 7,813,822 B1 | 10/2010 | Hoffberg |
| 7,899,630 B2 | 3/2011 | Kagan |
| 7,916,015 B1 | 3/2011 | Evancich et al. |
| 7,916,060 B2 | 3/2011 | Zhu et al. |
| 7,921,199 B1 | 4/2011 | Shirriff et al. |
| 7,961,736 B2 | 6/2011 | Ayyagari |
| 7,962,298 B2 | 6/2011 | Przydatek et al. |
| 7,999,696 B2 | 8/2011 | Wang et al. |
| 8,019,836 B2 | 9/2011 | Elliott et al. |
| 8,024,073 B2 | 9/2011 | Mes et al. |
| 8,037,173 B2 | 10/2011 | Tuckey et al. |
| 8,078,418 B2 | 12/2011 | Banhegyesi et al. |
| 8,160,824 B2 | 4/2012 | Spanier et al. |
| 8,190,381 B2 | 5/2012 | Spanier et al. |
| 8,193,929 B1* | 6/2012 | Siu .................. H04L 12/2829 340/538 |
| 8,250,246 B2 | 8/2012 | Brockmann et al. |
| 8,335,936 B2 | 12/2012 | Jonsson et al. |
| 8,402,267 B1 | 3/2013 | Graham et al. |
| 8,599,036 B2 | 12/2013 | Wang et al. |
| 8,635,036 B2 | 1/2014 | Pamulaparthy et al. |
| 8,717,007 B2 | 5/2014 | Banhegyesi |
| 8,812,979 B2 | 8/2014 | Khanke et al. |
| 8,933,815 B2 | 1/2015 | Kagan et al. |
| 8,949,990 B1* | 2/2015 | Hsieh .................. G06F 21/577 726/25 |
| 9,080,894 B2 | 7/2015 | Spanier et al. |
| 9,094,227 B2 | 7/2015 | Park |
| 9,161,102 B2 | 10/2015 | Millstein et al. |
| 9,268,552 B1 | 2/2016 | Kiiskila et al. |
| 9,310,792 B2 | 4/2016 | Lu et al. |
| 9,660,994 B2 | 5/2017 | McQuillan et al. |
| 10,303,860 B2 | 5/2019 | Koval et al. |
| 10,510,000 B1 | 12/2019 | Commons |
| 10,678,964 B2 | 6/2020 | Kawai |
| 10,972,556 B1 | 4/2021 | Cheng et al. |
| 11,276,395 B1 | 3/2022 | Jones et al. |
| 2002/0024453 A1 | 2/2002 | Maeda |
| 2002/0032535 A1 | 3/2002 | Alexander et al. |
| 2002/0048269 A1* | 4/2002 | Hong .................. H04L 29/06 370/389 |
| 2002/0052972 A1 | 5/2002 | Yim |
| 2002/0065872 A1 | 5/2002 | Genske et al. |
| 2002/0073211 A1* | 6/2002 | Lin .................. H04L 63/10 709/229 |
| 2002/0095406 A1 | 7/2002 | George |
| 2002/0105435 A1 | 8/2002 | Yee et al. |
| 2002/0120723 A1 | 8/2002 | Forth et al. |
| 2002/0129342 A1 | 9/2002 | Kil et al. |
| 2002/0133504 A1 | 9/2002 | Mahos et al. |
| 2002/0162014 A1 | 10/2002 | Przydatek et al. |
| 2002/0169570 A1 | 11/2002 | Spanier et al. |
| 2002/0174223 A1 | 11/2002 | Childers et al. |
| 2002/0188706 A1 | 12/2002 | Richards et al. |
| 2003/0005130 A1 | 1/2003 | Cheng |
| 2003/0014200 A1 | 1/2003 | Jonker et al. |
| 2003/0065757 A1 | 4/2003 | Mentze et al. |
| 2003/0084280 A1 | 5/2003 | Bryan et al. |
| 2003/0093429 A1 | 5/2003 | Nishikawa et al. |
| 2003/0110380 A1 | 6/2003 | Carolsfeld et al. |
| 2003/0163508 A1 | 8/2003 | Goodman |
| 2003/0178982 A1 | 9/2003 | Elms |
| 2003/0179714 A1 | 9/2003 | Gilgenbach et al. |
| 2003/0187550 A1 | 10/2003 | Wilson et al. |
| 2003/0200285 A1 | 10/2003 | Hansen et al. |
| 2003/0204756 A1* | 10/2003 | Ransom .................. G01D 4/004 713/300 |
| 2003/0226058 A1 | 12/2003 | Miller et al. |
| 2004/0078474 A1* | 4/2004 | Ramaswamy ........ H04L 67/325 709/229 |
| 2004/0088408 A1* | 5/2004 | Tsyganskiy ......... H04L 63/1408 709/225 |
| 2004/0098459 A1 | 5/2004 | Leukert-Knapp et al. |
| 2004/0107025 A1 | 6/2004 | Ransom et al. |
| 2004/0122833 A1* | 6/2004 | Forth .................. H04L 67/34 |
| 2004/0127775 A1 | 7/2004 | Miyazaki et al. |
| 2004/0128260 A1 | 7/2004 | Amedure et al. |
| 2004/0138834 A1 | 7/2004 | Blackett et al. |
| 2004/0162642 A1 | 8/2004 | Gasper et al. |
| 2004/0170181 A1 | 9/2004 | Bogdon et al. |
| 2004/0172207 A1* | 9/2004 | Hancock ............ G01R 19/2513 702/60 |
| 2004/0177062 A1 | 9/2004 | Urquhart et al. |
| 2004/0187028 A1 | 9/2004 | Perkins et al. |
| 2004/0193329 A1* | 9/2004 | Ransom .................. H04L 63/20 700/286 |
| 2004/0208182 A1 | 10/2004 | Boles et al. |
| 2004/0243735 A1 | 12/2004 | Rosenbloom et al. |
| 2004/0250059 A1 | 12/2004 | Ramelson et al. |
| 2005/0027464 A1 | 2/2005 | Jonker et al. |
| 2005/0033956 A1 | 2/2005 | Krempl |
| 2005/0060110 A1 | 3/2005 | Jones et al. |
| 2005/0093571 A1 | 5/2005 | Suaris et al. |
| 2005/0138421 A1 | 6/2005 | Fedronic et al. |
| 2005/0138432 A1 | 6/2005 | Ransom et al. |
| 2005/0144437 A1 | 6/2005 | Ransom et al. |
| 2005/0169309 A1 | 8/2005 | Tripathi et al. |
| 2005/0183128 A1 | 8/2005 | Assayag et al. |
| 2005/0187725 A1 | 8/2005 | Cox |
| 2005/0202808 A1 | 9/2005 | Fishman et al. |
| 2005/0234837 A1 | 10/2005 | Ramachandran et al. |
| 2005/0240540 A1 | 10/2005 | Borleske et al. |
| 2005/0253682 A1 | 11/2005 | Kato et al. |
| 2005/0273280 A1 | 12/2005 | Cox |
| 2005/0273281 A1 | 12/2005 | Wall et al. |
| 2006/0020788 A1 | 1/2006 | Han et al. |
| 2006/0047787 A1 | 3/2006 | Agarwal et al. |
| 2006/0052958 A1 | 3/2006 | Hancock et al. |
| 2006/0066456 A1 | 3/2006 | Jonker et al. |
| 2006/0066903 A1 | 3/2006 | Shiimori |
| 2006/0083260 A1 | 4/2006 | Wang et al. |
| 2006/0085419 A1 | 4/2006 | Rosen |
| 2006/0089932 A1 | 4/2006 | Buehler et al. |
| 2006/0145890 A1 | 7/2006 | Junker et al. |
| 2006/0155422 A1 | 7/2006 | Uy et al. |
| 2006/0155442 A1 | 7/2006 | Luo et al. |
| 2006/0161360 A1 | 7/2006 | Yao et al. |
| 2006/0161400 A1 | 7/2006 | Kagan |
| 2006/0200599 A1 | 9/2006 | Manchester et al. |
| 2006/0206433 A1 | 9/2006 | Scoggins |
| 2006/0265720 A1 | 11/2006 | Cai et al. |
| 2006/0267560 A1 | 11/2006 | Rajda et al. |
| 2006/0274899 A1 | 12/2006 | Zhu et al. |
| 2007/0047735 A1 | 3/2007 | Celli et al. |
| 2007/0058634 A1 | 3/2007 | Gupta et al. |
| 2007/0061786 A1 | 3/2007 | Zhou et al. |
| 2007/0067119 A1 | 3/2007 | Loewen et al. |
| 2007/0067121 A1 | 3/2007 | Przydatek et al. |
| 2007/0096765 A1 | 5/2007 | Kagan |
| 2007/0096942 A1 | 5/2007 | Kagan et al. |
| 2007/0106618 A1* | 5/2007 | Wu .................. G06Q 30/02 705/64 |
| 2007/0114987 A1 | 5/2007 | Kagan |
| 2007/0120705 A1 | 5/2007 | Kiiskila et al. |
| 2007/0136236 A1 | 6/2007 | Kussmaul et al. |
| 2007/0152058 A1 | 7/2007 | Yeakley et al. |
| 2007/0186111 A1 | 8/2007 | Durand |
| 2007/0240159 A1 | 10/2007 | Sugiyama |
| 2007/0255861 A1 | 11/2007 | Kain et al. |
| 2007/0263643 A1 | 11/2007 | Wadhawan |
| 2007/0266004 A1 | 11/2007 | Wall et al. |
| 2008/0028395 A1 | 1/2008 | Motta et al. |
| 2008/0033786 A1 | 2/2008 | Boaz et al. |
| 2008/0033920 A1 | 2/2008 | Colclasure et al. |
| 2008/0046205 A1* | 2/2008 | Gilbert .................. H04L 9/40 702/62 |
| 2008/0052384 A1 | 2/2008 | Marl et al. |
| 2008/0071482 A1 | 3/2008 | Zweigle et al. |
| 2008/0074285 A1 | 3/2008 | Guthrie |

(56) References Cited

U.S. PATENT DOCUMENTS

| | | |
|---|---|---|
| 2008/0077806 A1 | 3/2008 | Cui et al. |
| 2008/0086222 A1 | 4/2008 | Kagan |
| 2008/0103631 A1 | 5/2008 | Koliwad et al. |
| 2008/0104149 A1 | 5/2008 | Vishniac et al. |
| 2008/0130639 A1 | 6/2008 | Costa-Requena et al. |
| 2008/0147334 A1 | 6/2008 | Kagan |
| 2008/0168434 A1 | 7/2008 | Gee et al. |
| 2008/0172192 A1 | 7/2008 | Banhegyesi |
| 2008/0187116 A1 | 8/2008 | Reeves et al. |
| 2008/0195562 A1 | 8/2008 | Worth et al. |
| 2008/0195794 A1 | 8/2008 | Banker |
| 2008/0201723 A1 | 8/2008 | Bottaro et al. |
| 2008/0215264 A1 | 9/2008 | Spanier et al. |
| 2008/0228830 A1 | 9/2008 | Hawtin |
| 2008/0234957 A1 | 9/2008 | Banhegyesi et al. |
| 2008/0235355 A1 | 9/2008 | Spanier et al. |
| 2008/0238406 A1 | 10/2008 | Banhegyesi |
| 2008/0238713 A1 | 10/2008 | Banhegyesi et al. |
| 2008/0243404 A1 | 10/2008 | Banhegyesi |
| 2008/0291054 A1 | 11/2008 | Groft |
| 2009/0012728 A1 | 1/2009 | Spanier et al. |
| 2009/0037163 A1 | 2/2009 | Kong et al. |
| 2009/0055912 A1* | 2/2009 | Choi .................. G06F 21/41 |
| | | 726/6 |
| 2009/0070168 A1 | 3/2009 | Thompson et al. |
| 2009/0070447 A1 | 3/2009 | Jubinville et al. |
| 2009/0082879 A1 | 3/2009 | Dooley et al. |
| 2009/0082980 A1 | 3/2009 | Thurmond et al. |
| 2009/0094317 A1 | 4/2009 | Venkitaraman |
| 2009/0096654 A1 | 4/2009 | Zhu et al. |
| 2009/0115626 A1 | 5/2009 | Vaswani et al. |
| 2009/0119476 A1 | 5/2009 | Jernigan et al. |
| 2009/0172519 A1* | 7/2009 | Xu ..................... G06F 16/9577 |
| | | 715/234 |
| 2009/0190486 A1 | 7/2009 | LaVigne et al. |
| 2009/0196187 A1 | 8/2009 | Ooba et al. |
| 2009/0196206 A1 | 8/2009 | Weaver et al. |
| 2009/0228224 A1 | 9/2009 | Spanier et al. |
| 2009/0235075 A1 | 9/2009 | Cho et al. |
| 2009/0235090 A1 | 9/2009 | Chang |
| 2009/0265124 A1* | 10/2009 | Kagan .................. G01R 22/063 |
| | | 709/224 |
| 2009/0276102 A1 | 11/2009 | Smith et al. |
| 2009/0292894 A1 | 11/2009 | Henry et al. |
| 2009/0300165 A1 | 12/2009 | Tuckey et al. |
| 2009/0307178 A1 | 12/2009 | Kuhns et al. |
| 2009/0327483 A1 | 12/2009 | Thompson et al. |
| 2010/0007354 A1 | 1/2010 | Deaver et al. |
| 2010/0030734 A1 | 2/2010 | Chunilal |
| 2010/0031076 A1 | 2/2010 | Wan et al. |
| 2010/0054276 A1 | 3/2010 | Wang et al. |
| 2010/0057387 A1* | 3/2010 | Kagan .................. G01R 22/065 |
| | | 702/62 |
| 2010/0057628 A1* | 3/2010 | Trinidad .............. G06Q 10/06 |
| | | 705/301 |
| 2010/0058355 A1 | 3/2010 | Gernaey |
| 2010/0073192 A1 | 3/2010 | Goldfisher et al. |
| 2010/0094851 A1 | 4/2010 | Bent et al. |
| 2010/0121996 A1 | 5/2010 | Schmidt et al. |
| 2010/0169709 A1 | 7/2010 | Chiu et al. |
| 2010/0169876 A1 | 7/2010 | Mann |
| 2010/0175062 A1 | 7/2010 | Kim |
| 2010/0211682 A1 | 8/2010 | Capomassi et al. |
| 2010/0217871 A1 | 8/2010 | Gammon |
| 2010/0238003 A1 | 9/2010 | Chan et al. |
| 2010/0278187 A1 | 11/2010 | Hart et al. |
| 2010/0299441 A1 | 11/2010 | Hughes et al. |
| 2010/0324845 A1 | 12/2010 | Spanier et al. |
| 2011/0004350 A1* | 1/2011 | Cheifetz ............. H02J 13/0017 |
| | | 700/276 |
| 2011/0004426 A1 | 1/2011 | Wright et al. |
| 2011/0015961 A1 | 1/2011 | Chan |
| 2011/0016021 A1* | 1/2011 | Manning ............. G06F 21/554 |
| | | 705/26.8 |
| 2011/0029461 A1 | 2/2011 | Hardin, Jr. |
| 2011/0040809 A1 | 2/2011 | Spanier et al. |
| 2011/0069709 A1 | 3/2011 | Morris et al. |
| 2011/0072423 A1 | 3/2011 | Fukata |
| 2011/0078305 A1 | 3/2011 | Varela |
| 2011/0093790 A1* | 4/2011 | Maczuba ............. G06F 16/9574 |
| | | 715/745 |
| 2011/0093843 A1 | 4/2011 | Endo et al. |
| 2011/0099467 A1* | 4/2011 | Kapur .................... H04L 67/60 |
| | | 715/236 |
| 2011/0106589 A1 | 5/2011 | Blomberg et al. |
| 2011/0107357 A1 | 5/2011 | Cullimore |
| 2011/0157837 A1 | 6/2011 | Balgard et al. |
| 2011/0178651 A1 | 7/2011 | Choi et al. |
| 2011/0184671 A1 | 7/2011 | Abiprojo et al. |
| 2011/0282508 A1 | 11/2011 | Goutard et al. |
| 2011/0296496 A1 | 12/2011 | O'Donnell et al. |
| 2012/0041696 A1 | 2/2012 | Sanderford et al. |
| 2012/0059932 A1 | 3/2012 | Messer et al. |
| 2012/0078547 A1 | 3/2012 | Murdoch |
| 2012/0079471 A1 | 3/2012 | Vidal et al. |
| 2012/0099478 A1 | 4/2012 | Fu et al. |
| 2012/0109999 A1 | 5/2012 | Futty et al. |
| 2012/0126995 A1 | 5/2012 | Sobotka et al. |
| 2012/0173032 A1 | 7/2012 | Pamulaparthy et al. |
| 2012/0179648 A1 | 7/2012 | Loo |
| 2012/0209057 A1 | 8/2012 | Siess et al. |
| 2012/0216244 A1 | 8/2012 | Kumar et al. |
| 2012/0245595 A1 | 9/2012 | Kesavadas et al. |
| 2012/0265357 A1* | 10/2012 | Song ..................... G01D 4/002 |
| | | 700/291 |
| 2012/0296746 A1* | 11/2012 | Bleadall ............... G06F 16/332 |
| | | 707/723 |
| 2012/0299744 A1 | 11/2012 | Sfaelos |
| 2013/0009788 A1* | 1/2013 | Langenberg .......... G01D 4/002 |
| | | 340/870.02 |
| 2013/0055389 A1 | 2/2013 | Alvarez et al. |
| 2013/0066965 A1 | 3/2013 | Foti |
| 2013/0073059 A1 | 3/2013 | Brian et al. |
| 2013/0073374 A1 | 3/2013 | Heath |
| 2013/0084882 A1 | 4/2013 | Khorashadi et al. |
| 2013/0103657 A1 | 4/2013 | Kawa et al. |
| 2013/0151849 A1 | 6/2013 | Graham et al. |
| 2013/0158918 A1 | 6/2013 | Spanier et al. |
| 2013/0198507 A1 | 8/2013 | Kasuya |
| 2013/0200702 A1 | 8/2013 | Schöppner |
| 2013/0204450 A1 | 8/2013 | Kagan et al. |
| 2013/0293390 A1 | 11/2013 | Buhan et al. |
| 2013/0318627 A1 | 11/2013 | Lundkvist et al. |
| 2014/0025321 A1 | 1/2014 | Spanier |
| 2014/0058572 A1 | 2/2014 | Stein et al. |
| 2014/0094194 A1 | 4/2014 | Schwent et al. |
| 2014/0149836 A1 | 5/2014 | Bedard et al. |
| 2014/0172885 A1 | 6/2014 | Sekharan |
| 2014/0236371 A1 | 8/2014 | Ishihara et al. |
| 2014/0277788 A1 | 9/2014 | Forbes, Jr. |
| 2014/0281620 A1 | 9/2014 | Rallo et al. |
| 2014/0325679 A1 | 10/2014 | Heo et al. |
| 2015/0039279 A1 | 2/2015 | Volovoi |
| 2015/0089061 A1 | 3/2015 | Li et al. |
| 2015/0143108 A1 | 5/2015 | Demeter et al. |
| 2015/0178865 A1 | 6/2015 | Anderson et al. |
| 2015/0185748 A1 | 7/2015 | Ishchenko et al. |
| 2015/0286394 A1 | 10/2015 | Koval |
| 2015/0294013 A1 | 10/2015 | Ozer |
| 2015/0316907 A1 | 11/2015 | ElBsat et al. |
| 2015/0317151 A1 | 11/2015 | Falcy et al. |
| 2015/0317589 A1 | 11/2015 | Anderson et al. |
| 2015/0324896 A1 | 11/2015 | Marson et al. |
| 2015/0341969 A1 | 11/2015 | Brochu et al. |
| 2016/0011616 A1 | 1/2016 | Janous et al. |
| 2016/0034437 A1 | 2/2016 | Yong et al. |
| 2016/0156184 A1 | 6/2016 | Sharma et al. |
| 2016/0283256 A1 | 9/2016 | Standley et al. |
| 2016/0294953 A1 | 10/2016 | Prabhakar et al. |
| 2016/0359684 A1 | 12/2016 | Rizqi et al. |
| 2016/0364648 A1 | 12/2016 | Du et al. |
| 2017/0011320 A1 | 1/2017 | Anderson et al. |
| 2017/0039372 A1 | 2/2017 | Koval et al. |

(56) References Cited

U.S. PATENT DOCUMENTS

| | | | |
|---|---|---|---|
| 2017/0063566 A1* | 3/2017 | Seminario | H04L 67/12 |
| 2017/0140149 A1 | 5/2017 | Dumas et al. | |
| 2017/0147329 A1 | 5/2017 | Shutt et al. | |
| 2017/0162320 A1 | 6/2017 | Rumrill | |
| 2017/0180137 A1 | 6/2017 | Spanier et al. | |
| 2017/0185056 A1 | 6/2017 | Satou | |
| 2017/0238805 A1 | 8/2017 | Addison et al. | |
| 2017/0270414 A1 | 9/2017 | Ignatova et al. | |
| 2017/0285114 A1 | 10/2017 | Bickel et al. | |
| 2017/0317495 A1 | 11/2017 | Pavlovski et al. | |
| 2017/0323208 A1 | 11/2017 | Al-Mohssen et al. | |
| 2017/0373500 A1 | 12/2017 | Shafi et al. | |
| 2018/0025423 A1 | 1/2018 | Utsumi et al. | |
| 2018/0066860 A1 | 3/2018 | Carlson et al. | |
| 2018/0260695 A1 | 9/2018 | Majumdar et al. | |
| 2018/0260920 A1 | 9/2018 | Saratsis et al. | |
| 2018/0275898 A1 | 9/2018 | Bhansali et al. | |
| 2019/0086891 A1 | 3/2019 | Kawamoto et al. | |
| 2019/0102411 A1 | 4/2019 | Hung et al. | |
| 2019/0138964 A1 | 5/2019 | Morita et al. | |
| 2019/0205116 A1 | 7/2019 | Chen et al. | |
| 2019/0260204 A1 | 8/2019 | Koval et al. | |
| 2019/0340545 A1 | 11/2019 | Minegishi et al. | |
| 2019/0349733 A1 | 11/2019 | Nolan et al. | |
| 2020/0143522 A1 | 5/2020 | Vogels et al. | |
| 2020/0266628 A1 | 8/2020 | Kato et al. | |
| 2020/0273268 A1 | 8/2020 | Bhattacharyya et al. | |
| 2020/0333767 A1 | 10/2020 | Engelstein et al. | |
| 2022/0279220 A1 | 9/2022 | Khavronin et al. | |

FOREIGN PATENT DOCUMENTS

| | | |
|---|---|---|
| JP | 2001312712 A | 11/2001 |
| JP | 2009225629 A | 10/2009 |
| KR | 101522175 B1 | 5/2015 |
| WO | 2008099035 A1 | 8/2008 |
| WO | 2009044369 A2 | 4/2009 |
| WO | 2009044369 A3 | 5/2009 |

OTHER PUBLICATIONS

Codingfreak, "https://web.archive.org/web/20100426123449/http://codingfreak.blogspot.com/2010/01/iptables-rate-limit-incoming.htm", Apr. 26, 2010).*

"Use Excel as a Web Browser" at https://www.youtube.com/watch?v=A7LukCXev78 (Year: 2010).*

Paladion, https://www.paladion.net/blogs/introduction-to-code-obfuscation, 2004 (Year: 2004).*

Microsoft, Computer Dictionary, 2002, 5th Ed. (Year: 2002).*

ION Technology, 7500 ION 7600 ION High Visibility Energy & Power Quality Compliance Meters, Power Measurement, specification, pp. 1-8, revision date Nov. 30, 2000.

Microsoft TechNet, Using DNS Servers with DHCP, Jan. 21, 2005; Accessed from https://technet.microsoft.com/en-us/library/cc787034 on Jun. 9, 2015; pp. 1-4.

Allard, Jeremie, et al., "Jini meets UPnP: an architecture for Jini/UPnP interoperability.", Proceedings of the 2003 Symposium on Applications and the Internet, 2003. IEEE, 2003, 8 pages.

Braden, R (editor), "Requirements for Internet Hosts-Application and Support", RFC 1123, pp. 1-97, Oct. 1989.

Chima, Chikodi, "How Social Media Will Make the smart Energy Grid More Efficient", mashable.com, Feb. 8, 2011, pp. 1-4.

Communicator EXT 3.0 User Manual Revision 1.32, Electro Industries/Gauge Tech, 558 pages, Aug. 27, 2007.

Deutsch, P., Emtage, A., and Marine, A., "How to Use Anonymous FTP", RFC1635, pp. 1-13, May 1994.

Duncan, Brent K. et al., "Protection, metering, monitoring, and control of medium-voltage power systems.", IEEE Transactions on Industry Applications, vol. 40, No. 1, Jan./Feb. 2004; pp. 33-40.

Futura+Series, "Advanced Power Monitoring and Analysis for the 21st Century", Electro Industries/Gauge Tech, specification, 8 pages, Apr. 13, 2000.

Gonzales, Jesus and Papa, Mauricio, "Passive Scanning in Modbus Networks;" 2008, in IFIP International Federation for Information Processing, vol. 253, Critical Infrastructure Protection; 2008; pp. 175-187.

Hubbert, "What is flat file?", WhatIs.com, http://searchsqlserver.techtarget.com/definition/flat-file, Jul. 2006, 1 pp.

HW Virtual Serial Port, "HW Virtual Serial Port" Jul. 2003, http://www.trcontrolsolutions.com/pdfs/hw_vsp_v104_en.pdf; pp. 1-4.

IEC 61000-4-15: Electromagnetic compatibility (EMC) Part 4: Testing and measuring techniques, Section 15: Flickermeter-Functional and design specifications; CENELEC-European Committee for Electrotechnical Standardization; pp. 1-25; Apr. 1998.

ION Technology 7700 ION 3-Phase Power Meter, Analyzer and Controller, Power Measurement, specification, pp. 1-10, revision date Dec. 8, 1998.

ION Technology, 7500 ION High Visibility 3-Phase Energy & Power Quality Meter, Power Measurement, specification, pp. 1-8, revision date Mar. 21, 2000.

ION7550/ion7650 PowerLogic power-monitoring units, Technical data sheets, pp. 1-12, Copyright 2006 Schneider Electric.

Natarajan "4 Easy Steps to Upgrade Linksys Wireless Router" thegeekstuff.com, 2009, 3 pages. retreived from https://www.thegeekstuff.com/2009/06/how-to-upgrade-linksys-wireless-router-firmware on Jun. 7, 2019 (Year: 2009).

Nexus 1250 Installation and Operation Manual Revision 1.20, Electro Industries/Gauge Tech, 50 pages, Nov. 8, 2000.

Nexus 1250, Precision Power Meter & Data Acquisition Node, Accumeasure Technology, Electro Industries/Gauge Tech, specification, 16 pages, Nov. 1999.

Performance Power Meter & Data Acquisition Node, Electro Industries/Gauge Tech, Nexus 1250 specification, 8 pages, Dec. 14, 2000.

Postel, J.B., and Reynolds, J.K. "File Transfer Protocol (FTP)", RFC959, pp. 1-66, Oct. 1985.

PowerLogic Series 4000 Circuit Monitors, pp. 1-4; Document #3020HO0601; Jan. 2006.

RFC2228 FTP Security Extensions; Network Working Group, Internet Society, 1997; Retrieved from https://tools.ietf.org/html/rfc2228 Apr. 18, 2019; (Year: 1997); pp. 1-28.

Speirs, "What is binary file?", WhatIs.com, http://whatis.techtarget.com/definition/binary-file, Apr. 2005, 1 pp.

UPnP Forum, "UPnP Device Architecture 1.0", Rev. Apr. 24, 2008, pp. 1-80.

User's Installation & Operation and User's Programming Manual. The Futura Series, Electro Industries, pp. 1-64, Copyright 1995.

White, Russ, "Working with IP addresses"; http://web.archive.org/web/20060508172602/http://www.cisco.com/web/about/ac123/ac147/archived_issues/ipj_9-1/ip_addresses.tml, May 8, 2006; Copyright 1992-2006 Cisco Systems, Inc., pp. 1-8.

Wikipedia, Burst mode (computing), https://web.archive.org/web/20081018044345/http://en.wikipedia.org/wiki/Burst_mode_(computing), Oct. 18, 2008, 1 pp.

Wikipedia, File Transfer Protocol, https://web.archive.org/web/20051216071210/http:en.wikipedia.org/wiki/File_Transfer_Protocol, Dec. 16, 2005, 9 pp.

Wikipedia, Universal Plug and Play, https://web.archive.org/web/2001014015536/http://en.wikipedia.org/wiki/Universal_Plug_and_Play, Oct. 14, 2007, 14 pp.

Wils, Andrew, et al., "Device discovery via residential gateways.", IEEE Transactions on Consumer Electronics, vol. 48, No. 3; Aug. 2002; pp. 478-483.

Yum, Secured Remote Data, Manual p. 2012; Retrieved from yum.baseurl.org/wiki/securedRemoteData on Apr. 18, 2019. (Dated Reference from Archive.org attached) (Year: 2012) pp. 1-2.

Zeinalipour-Yazti et ai, MicroHash: An Efficient Index Structure for Flash-Based Sensor Devices, Proceedings of the 4th Conference on USENIX Conference on File and Storage Technologies, vol. 4, Dec. 2005, pp. 14.

Zhang, Chun, et al., "On supporting containment queries in relational database management systems.", ACM SIGMOD Record. vol. 30. No. 2. ACM, 2001; pp. 425-436.

Wikipedia, User Datagram Protocol, https://web.archive.org/web/20050823032448/https://en. wikipedia .org/wiki/User_Datagram_Protocol, Aug. 23, 2005, 2 pp. (Year: 2005).

(56) References Cited

OTHER PUBLICATIONS

"The Debian New Maintainer's Guide", Debian.org, 2011, Chapters 1, 6, and B. retrieved from https://lweb.archive.org/web/2011 051401193B/http://www.debian.org/doc/manuals/maint-guide/start. en.html (April 2B, 2021). (Year: 2011).

Microsoft, Microsoft Computer Dictionary, 5th Ed. 2002; pp. 174, 215, and 276 (excerpt includes table of contents and frontmatter). (Year: 2002).

Tufekci, P., 2014. Prediction of full load electrical power output of a base load operated combined cycle power plant using machinelearning methods. International Journal of Electrical Power & Energy Systems, 60, pp. 126-140. (Year: 2014).

Andersen, M.P. and Culler, D.E., 2016. Btrdb: Optimizing storage system design for timeseries processing. In 14th {USENIX} Conference on File and Storage Technologies ({FAST} 16) (pp. 39-52). (Year: 2016).

Dong Yu, Wayne Xiong, Jasha Droppo, Andreas Stolcke, Guoli Ye, Jinyu Li, Geoffrey Zweig, 2016. Proc. Interspeech: Deep Convolutional Neural Networks with Layer-wise Context Expansion and Attention, 5 pages, Sep. 2016.

Janetzko, H., Stoffel, F., Mittelstadt, S. and Keim, DA, 2014. Anomaly detection for visual analytics of power consumption data. Computers & Graphics, 38, pp. 27-37. (Year: 2014).

Kezunovic, M., 2011. Smart fault location for smart grids. IEEE transactions on smart grid, 2(1), pp. 11-22. (Year: 2011).

Milanovic, J.V., Aung, M.T. and Gupta, C.P., 2005. The influence of fault distribution on stochastic prediction of voltage sags. IEEE Transactions on Power Delivery, 20(1), pp. 278-285. (Year:2005).

Pan, J., Zi, Y., Chen, J., Zhou, Z. and Wang, B., 2017. LiftingNet: A novel deep learning network with layerwise feature learningfrom noisy mechanical data for fault classification. IEEE Transactions on Industrial Electronics, 65(6), pp. 4973-4982. (Year: 2017).

Trunov, A.S., Voronova, L.I., Voronov, V.I., Sukhachev, D.I. and Strelnikov, V.G., Mar. 2018. Legacy applications modelintegration to support scientific experiment. In 2018 Systems of Signals Generating and Processing in the Field of on BoardCommunications (pp. 1-7). IEEE. (Year: 2018).

Whatis.com, "What is a Network Interface Card?", hUps://www. techtarget.com/searchnetworking/definition/network-interface-card ?_gl=1 *13qjdky*_ ga*NzA 1 MzE3NjAyLjE2Mzl3NzU5NjA .*_ga_ TQKE4GS5P9*MTYzMjk1 MDkzNC4yLi EuMTYzMjk1 MTY3Ny4w&_ga=2.164813883.525309060.1632950935-705317602. 1632775960, Sep. 27, 2021; 5 pp. (Year: 2021).

The Study Genius, "What is N IC (Network Interface Card)? How NIC works?", https://web.archive.org/web/20201117135313/https://www.thestudygenius.com/what-is-nic-network-interface-card/, 9 pp., Nov. 17, 2020 (Year: 2020).

Xia et al. 2018 IEEE Access, "Secure Session Key Management Scheme for Meter-Reading System Based on LoRa Technology", pp. 75015-75024 (Year: 2018).

Khan et al., "Approach for smart meter load profiling in Monte Carlo simulation applications," IET Generation, Transmission & Distribution, 2017, vol. 11, No. 7, pp. 1856-1864.

Wikipedia, Dojo Toolkit, hUps://web.archive.org/web/20130201 004903/hUps://en.wikipedia.org/wiki/Dojo_Toolkit, Feb. 1, 2013. (10 pages).

\* cited by examiner

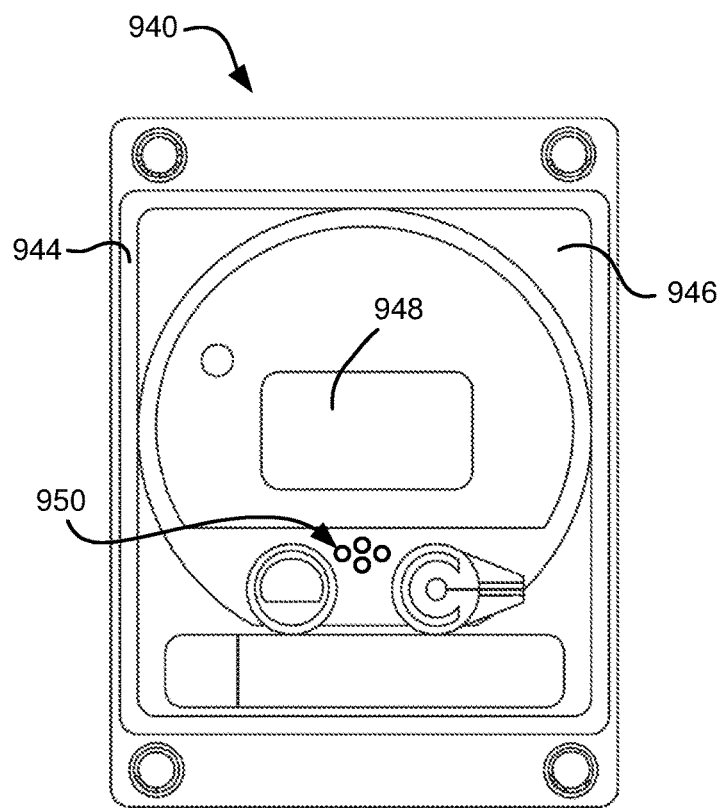
FIG. 7E
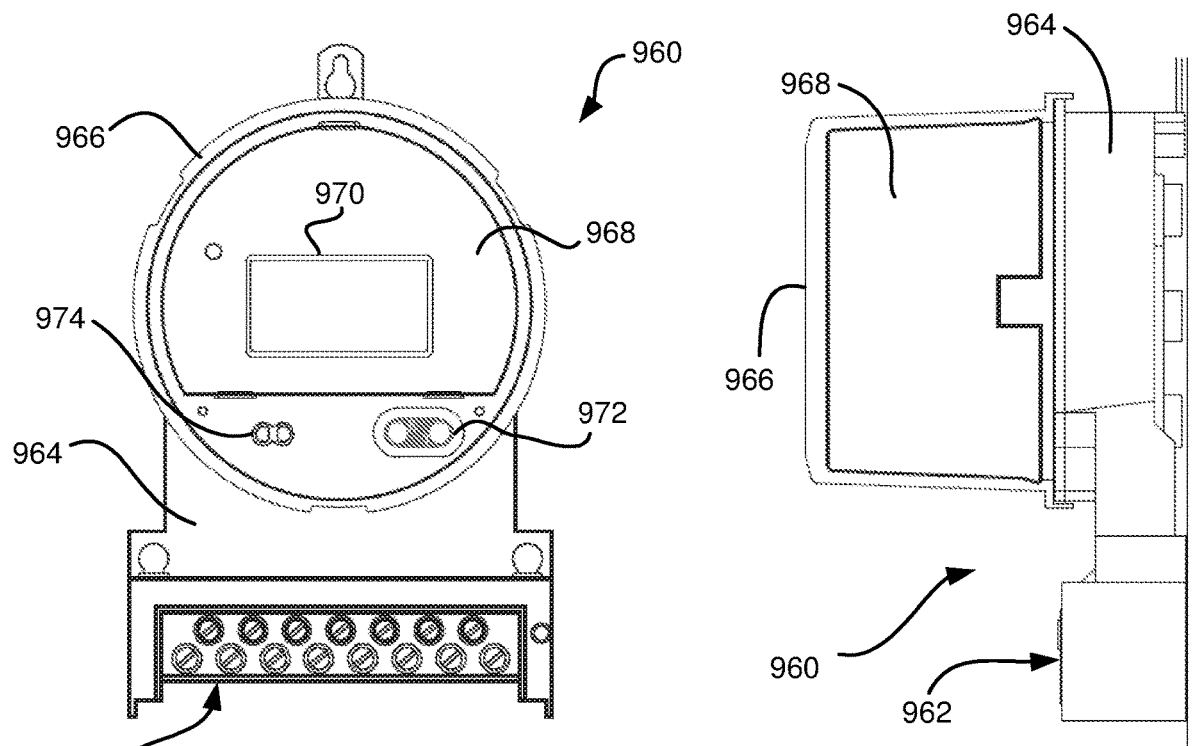
FIG. 7G
FIG. 7H

DYNAMIC WEBPAGE INTERFACE FOR AN INTELLIGENT ELECTRONIC DEVICE

PRIORITY

This application claims priority to U.S. Provisional Patent Application No. 62/013,091 filed Jun. 17, 2014, entitled "DYNAMIC WEBPAGE INTERFACE FOR AN INTELLIGENT ELECTRONIC DEVICE", the contents of which are hereby incorporated by reference in its entirety.

This application is a continuation-in-part application of U.S. patent application Ser. No. 13/831,708 filed on Mar. 15, 2013, entitled "SYSTEMS AND METHODS FOR COLLECTING, ANALYZING, BILLING, AND REPORTING DATA FROM INTELLIGENT ELECTRONIC DEVICES", which a continuation-in-part application of U.S. patent application Ser. No. 13/644,877 filed on Oct. 4, 2012, entitled "INTELLIGENT ELECTRONIC DEVICE COMMUNICATION SOLUTIONS FOR NETWORK TOPOLOGIES", which claims priority to U.S. Provisional Patent Application No. 61/542,935, filed Oct. 4, 2011, the contents of all of which are hereby incorporated by reference in their entireties.

CROSS REFERENCE TO RELATED APPLICATIONS

This application is related to U.S. patent application Ser. No. 13/799,832, filed Mar. 13, 2013, entitled "SYSTEMS AND METHODS FOR COLLECTING, ANALYZING, BILLING, AND REPORTING DATA FROM INTELLIGENT ELECTRONIC DEVICES" and to U.S. patent application Ser. No. 13/836,671, filed Mar. 15, 2013, entitled "SYSTEMS AND METHODS FOR PROCESSING METER INFORMATION IN A NETWORK OF INTELLIGENT ELECTRONIC DEVICES", the contents of both of which are hereby incorporated by reference in their entireties.

BACKGROUND

1. Field

The present disclosure relates generally to the usage of dynamic webpage addresses and content in intelligent electronic devices (IEDs), e.g., meters, to provide a richer and more targeted experience for a user, as well as improving external automation by providing an interface that can be used to easily control the meter, and query its data.

2. Description of the Related Art

Web pages, typically transferred via the Hypertext Transfer Protocol, or HTTP protocol, are the principle form of communications over modern networks. Such web pages are typically composed of three components: a web server 12, a collection of page resources 14, and web addresses 16, as illustrated in FIG. 1.

Web servers typically use the Hypertext Transfer Protocol, or HTTP, to transfer resource requests and responses. The HTTP protocol is a standard protocol which is composed of a command, address, options, and body. The command, such as GET or POST, instructs the web server on what to do. The address is used to specify which resource is to be affected, or which resource is requested. The options specify additional information for a web server to process the message, such as source request information, length of data requested, or requests for fresh data. The server may optionally ignore these fields. Finally, the body contains the data being transferred. In the case of a GET request, the body contains nothing. For a GET response, the body contains the resource requested. In the case of a POST request, the body contains the data to be posted to the server. For a POST response, the body contains the server's status response to the POST.

HTTP is defined as a stateless protocol, which means that the web server should not maintain information about the client that is connected. Only commands such as POST are intended to allow modifications to the resources on the web server. The web server should only be indirectly affected by such POST's. GET requests should have no side effects.

The web server 12 is a component running on a device 18 which responds to requests for web resources, which are represented by a web address 16. When the web server receives a HTTP GET request, it will process the specified resource address to determine the resource to be returned. One common implementation of this resource is a file of the same name on the file system local to the web server. Another common implementation is to generate the Hypertext Markup Language, or HTML, for the resource when it is requested, allowing for web resources to be returned to the requestor that represent the current state of the information the resource represents.

Hypertext Markup Language, or HTML, is a User Interface, or UI, language used to represent webpages. HTML is understood and rendered by all modern web browsers 20. HTML is a subset of the Standard Generalized Markup Language, or SGML, which represents sections of a page as nodes in the markup tree, and represents graphical elements such as labels, buttons, and pictures, as nodes in those sections.

Additionally, HTML allows for the specification of script sections, such as JavaScript, which allow for including code which is to be executed on the browser 20, or client side 22, directly. This simplifies the design of web pages, as it allows for client side actions to be taken, such as verifying values entered before sending that information back to the web server, changing the color of a picture when the mouse moves over it, or changing the text of a label element based on another resource.

These approaches are well suited to fixed graphical representation of data, such as static web pages, as well as requesting data of a predefined format and nature. The appearance of a changing page can even be simulated through JavaScript that loads another resource file containing values, which are parsed to overwrite the existing labels displaying values.

However, such methods often result in flat looking pages, due to their static nature. It is difficult to make such pages react dynamically to changing content, such as lists or dynamic graphics, without putting extra burden on the server by generating a new page for each request.

Additionally, if the page is statically rendered, a large amount of data must be transferred with every refresh, as the page must contain both the graphical rendering, and the data to be displayed. This can be alleviated by separating the data into a dedicated resource, however this resource must either contain more values then are needed, thus slowing the transfer of the resource, or a separate resource must be created for each page that needs data.

It is appreciated that client side rendering engines, such as by non-limiting example, Flash, Silverlight, or Java Applets, can be employed to improve the appearance of the page. However, these methods are still bound by the ability of the web server to transfer data to the client. They also have the additional drawback that many modern browsers disable them due to security risks. Additionally, they often require a large amount of data transfer to download the code for the engine to execute.

SUMMARY

A dynamic webpage interface for an intelligent electronic device (IED) and method thereof are provided. The present disclosure provides for separating a webpage into multiple discrete resources, and to customize the resources returned by a web server based on the contents of the request. Such a custom request may be implemented by a Web Services interface, such as content based API's like SOAP (Simple Object Access Protocol), or address and command based API's like REST (Representational State Transfer). Such a custom request may also be implemented by server side processing, such as CGI (Common Gateway Interface), PHP (Hypertext Preprocessor), or other server side engines.

BRIEF DESCRIPTION OF THE DRAWINGS

These and other objects, features and advantages of the present disclosure will be apparent from a consideration of the following Detailed Description considered in conjunction with the drawing Figures, in which:

FIGS. 7A-7H illustrate exemplary form factors for an intelligent electronic device (IED) in accordance with an embodiment of the present disclosure.

DETAILED DESCRIPTION

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

Embodiments of the present disclosure will be described herein below with reference to the accompanying drawings.

As used herein, intelligent electronic devices ("IEDs") can be any device that senses electrical parameters and computes data including, but not limited to, Programmable Logic Controllers ("PLC's"), Remote Terminal Units ("RTU's"), electric power meters, panel meters, protective relays, fault recorders, phase measurement units, serial switches, smart input/output devices and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power that they are metering.

It is to be appreciated that an intelligent electronic device may take various forms and still be within the scope of the present disclosure. An exemplary intelligent electronic device (IED) 110, e.g., a meter, in accordance with the present disclosure is shown in FIG. 2.

Figure 1:
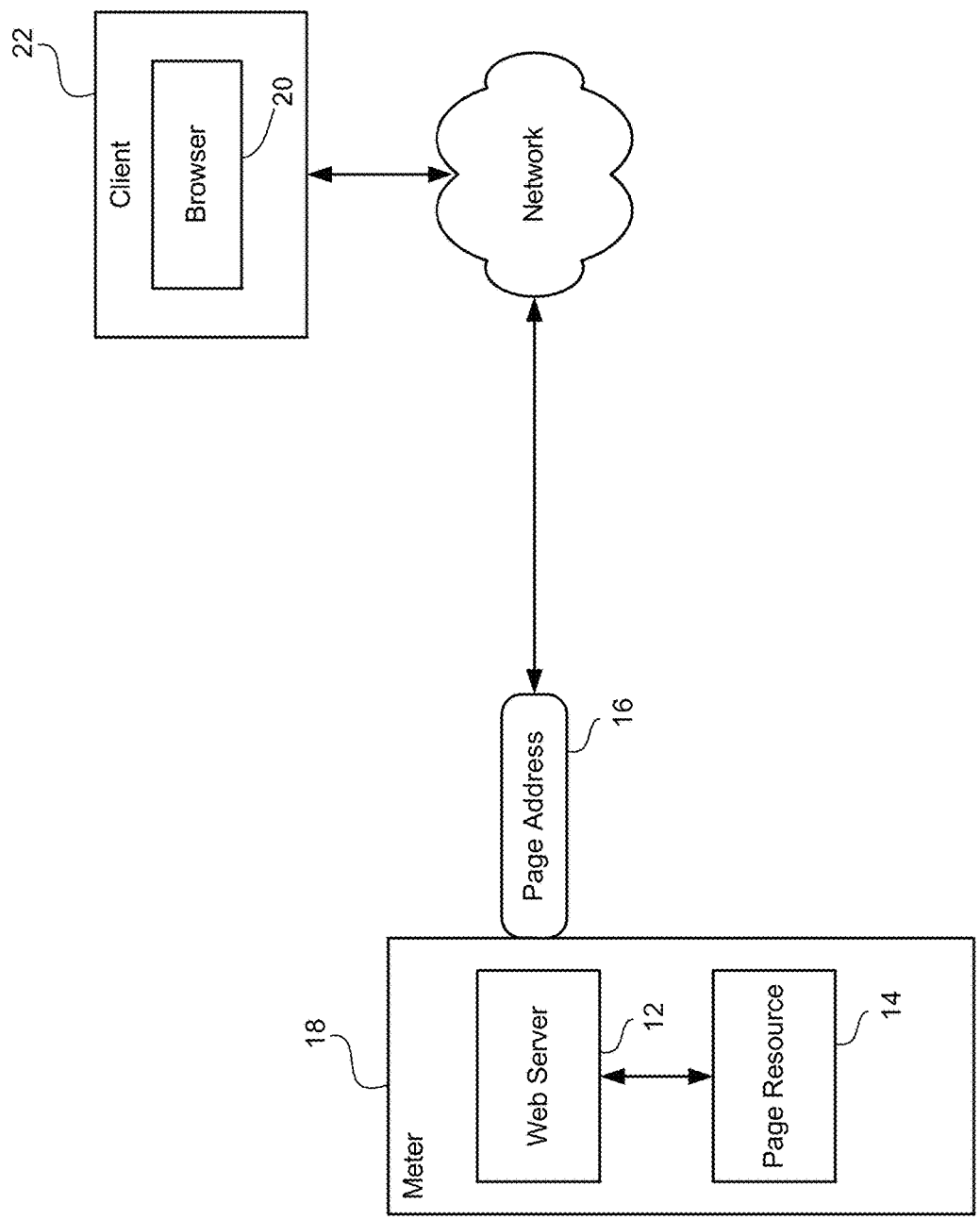
FIG. 1 illustrates an example of a web browser on a client machine, accessing, via a network, a resource specified by a page address on a web server on a meter or an intelligent electronic device (IED) in accordance with the present disclosure.
Figure 2:
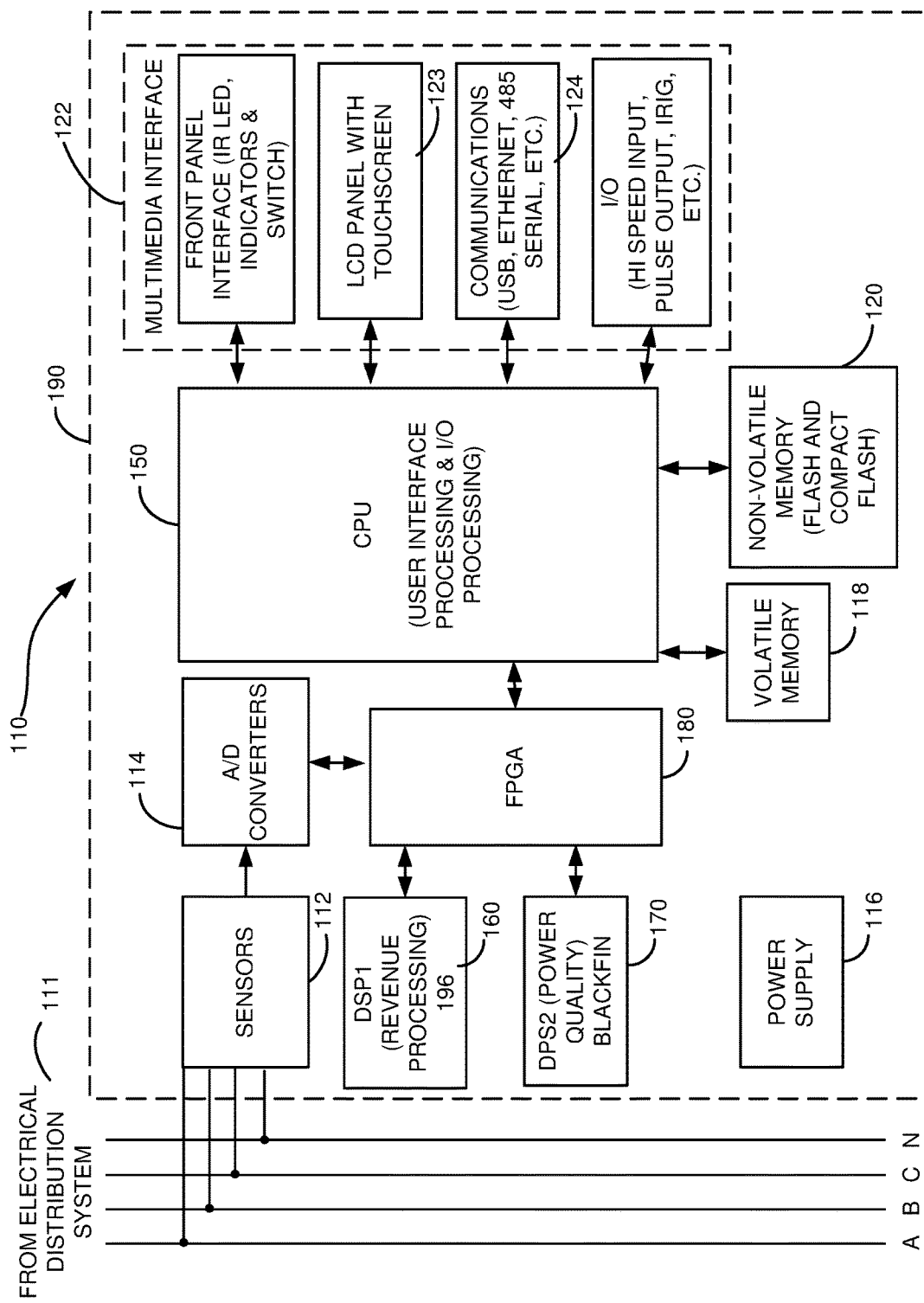
FIG. 2 is a block diagram of an intelligent electronic device (IED) according to an embodiment of the present disclosure.

FIG. 2 is a block diagram of an intelligent electronic device (IED) 110 for monitoring and determining power usage and power quality for any metered point within a power distribution system and for providing a data transfer system for faster and more accurate processing of revenue and waveform analysis.

The IED 110 of FIG. 2 includes a plurality of sensors 112 coupled to various phases A, B, C and neutral N of an electrical distribution system 111, a plurality of analog-to-digital (A/D) converters 114, including inputs coupled to the sensor 112 outputs, a power supply 116, a volatile memory 118, an non-volatile memory 120, a multimedia user interface 122, and a processing system that includes at least one central processing unit (CPU) 50 (or host processor) and/or one or more digital signal processors, two of which are shown, i.e., DSP1 160 and DSP2 170. The IED 110 also includes a Field Programmable Gate Array 180 which performs a number of functions, including, but not limited to, acting as a communications gateway for routing data between the various processors 150, 160, 170, receiving data from the A/D converters 114 performing transient detection and capture and performing memory decoding for CPU 150 and the DSP processor 160. In one embodiment, the FPGA 180 is internally comprised of two dual port memories to facilitate the various functions. It is to be appreciated that the various components shown in FIG. 2 are contained within housing 190. Exemplary housings will be described below in relation to FIGS. 7A-7H.

The plurality of sensors 112 sense electrical parameters, e.g., voltage and current, on incoming lines, (i.e., phase A, phase B, phase C, neutral N), from an electrical power distribution system 111, e.g., an electrical circuit. In one embodiment, the sensors 112 will include current transformers and potential transformers, wherein one current transformer and one potential or voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 114 configured to convert the analog output voltage from the transformer to a digital signal that can be processed by the CPU 150, DSP1 160, DSP2 170, FPGA 180 or any combination thereof.

A/D converters 114 are respectively configured to convert an analog voltage output to a digital signal that is transmitted to a gate array, such as Field Programmable Gate Array (FPGA) 180. The digital signal is then transmitted from the FPGA 180 to the CPU 150 and/or one or more DSP processors 160, 170 to be processed in a manner to be described below.

The CPU 150 or DSP Processors 160, 170 are configured to operatively receive digital signals from the A/D converters 114 (see FIG. 2) to perform calculations necessary to determine power usage and to control the overall operations of the IED 110. In some embodiments, CPU 150, DSP1 160 and DSP2 170 may be combined into a single processor, serving the functions of each component. In some embodiments, it is contemplated to use an Erasable Programmable Logic Device (EPLD) or a Complex Programmable Logic Device (CPLD) or any other programmable logic device in place of the FPGA 180. In some embodiments, the digital samples, which are output from the A/D converters 114 are sent directly to the CPU 150 or DSP processors 160, 170, effectively bypassing the FPGA 180 as a communications gateway.

The power supply 116 provides power to each component of the IED 110. In one embodiment, the power supply 116 is a transformer with its primary windings coupled to the incoming power distribution lines 111 and having windings to provide a nominal voltage, e.g., 5 VDC, 12 VDC and −12 VDC, at its secondary windings. In other embodiments, power may be supplied from an independent power source to the power supply 116. For example, power may be supplied from a different electrical circuit or an uninterruptible power supply (UPS).

In one embodiment, the power supply 116 can be a switch mode power supply in which the primary AC signal will be converted to a form of DC signal and then switched at high frequency, such as, for example, 100 Khz, and then brought through a transformer to step the primary voltage down to, for example, 5 Volts AC. A rectifier and a regulating circuit would then be used to regulate the voltage and provide a stable DC low voltage output. Other embodiments, such as, but not limited to, linear power supplies or capacitor dividing power supplies are also contemplated.

The multimedia user interface 122 is shown coupled to the CPU 150 in FIG. 2 for interacting with a user and for communicating events, such as alarms and instructions to the user. The multimedia user interface 122 may include a display 123 for providing visual indications to the user. The display may be embodied as a touch screen, a liquid crystal display (LCD), a plurality of LED number segments, individual light bulbs or any combination. The display 123 may provide information to the user in the form of alpha-numeric lines, computer-generated graphics, videos, animations, etc. The multimedia user interface 122 further includes a speaker or audible output means for audibly producing instructions, alarms, data, etc. The speaker is coupled to the CPU 150 via a digital-to-analog converter (D/A) for converting digital audio files stored in a memory 118 or non-volatile memory 120 to analog signals playable by the speaker. An exemplary interface is disclosed and described in commonly owned pending U.S. application Ser. No. 11/589,381, entitled "POWER METER HAVING AUDIBLE AND VISUAL INTERFACE", which claims priority to expired U.S. Provisional Patent Appl. No. 60/731,006, filed Oct. 28, 2005, the contents of which are hereby incorporated by reference in their entireties.

The IED 110 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The IED 110 further comprises a volatile memory 118 and a non-volatile memory 120. In addition to storing audio and/or video files, volatile memory 118 will store the sensed and generated data for further processing and for retrieval when called upon to be displayed at the IED 110 or from a remote location. The volatile memory 118 includes internal storage memory, e.g., random access memory (RAM), and the non-volatile memory 120 includes removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed. Such memory will be used for storing historical trends, waveform captures, event logs including time-stamps and stored digital samples for later downloading to a client application, web-server or PC application.

In a further embodiment, the IED 110 will include a communication device 124, also know as a network interface, for enabling communications between the IED or meter, and a remote terminal unit, programmable logic controller and other computing devices, microprocessors, a desktop computer, laptop computer, other meter modules, another IED, etc. The communication device 124 may be a modem, network interface card (NIC), wireless transceiver, etc. The communication device 124 will perform its functionality by hardwired and/or wireless connectivity. The hardwire connection may include but is not limited to hard wire cabling e.g., parallel or serial cables, RS232, RS485, USB cable, Firewire (1394 connectivity) cables, Ethernet, and the appropriate communication port configuration. The wireless connection will operate under any of the various wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission, cellular transmission or any other type of communication protocols, communication architecture or systems currently existing or to be developed for wirelessly transmitting data including spread spectrum 900 MHz, or other frequencies, Zigbee, WiFi, or any mesh enabled wireless communication.

The IED 110 may communicate to a server or other computing device via the communication device 124. The IED 110 may be connected to a communications network, e.g., the Internet, by any means, for example, a hardwired or wireless connection, such as dial-up, hardwired, cable, DSL, satellite, cellular, PCS, wireless transmission (e.g., 802.11a/b/g), etc. It is to be appreciated that the network may be a local area network (LAN), wide area network (WAN), the Internet or any network that couples a plurality of computers to enable various modes of communication via network messages. Furthermore, the server will communicate using various protocols such as Transmission Control Protocol/Internet Protocol (TCP/IP), File Transfer Protocol (FTP), Hypertext Transfer Protocol (HTTP), etc. and secure protocols such as Hypertext Transfer Protocol Secure (HTTPS), Internet Protocol Security Protocol (IPSec), Point-to-Point Tunneling Protocol (PPTP), Secure Sockets Layer (SSL) Protocol, etc. The server will further include a storage medium for storing a database of instructional videos, operating manuals, etc.

In an additional embodiment, the IED 110 will also have the capability of not only digitizing waveforms, but storing the waveform and transferring that data upstream to a central computer, e.g., a remote server, when an event occurs such as a voltage surge or sag or a current short circuit. This data will be triggered and captured on an event, stored to memory, e.g., non-volatile RAM, and additionally transferred to a host computer within the existing communication infrastructure either immediately in response to a request from a remote device or computer to receive said data in response to a polled request. The digitized waveform will also allow the CPU 150 to compute other electrical parameters such as harmonics, magnitudes, symmetrical components and phasor analysis. Using the harmonics, the IED 110 will also calculate dangerous heating conditions and can provide harmonic transformer derating based on harmonics found in the current waveform.

In a further embodiment, the IED 110 will execute an e-mail client and will send e-mails to the utility or to the customer direct on an occasion that a power quality event occurs. This allows utility companies to dispatch crews to repair the condition. The data generated by the IEDs or meters are use to diagnose the cause of the condition. The data may be transferred through the infrastructure created by the electrical power distribution system. The email client will utilize a POP3 or other standard mail protocol. A user will program the outgoing mail server and email address into the IED or meter. An exemplary embodiment of said metering is described in U.S. Pat. No. 6,751,563, which all contents thereof are incorporated by reference herein.

The techniques of the present disclosure can be used to automatically maintain program data and provide field wide updates upon which IED firmware and/or software can be upgraded. An event command can be issued by a user, on a schedule or by digital communication that will trigger the IED 110 to access a remote server and obtain the new program code. This will ensure that program data will also be maintained allowing the user to be assured that all information is displayed identically on all units.

It is to be understood that the present disclosure may be implemented in various forms of hardware, software, firmware, special purpose processors, or a combination thereof. The IED 110 also includes an operating system and micro instruction code. The various processes and functions described herein may either be part of the micro instruction code or part of an application program (or a combination thereof) which is executed via the operating system.

It is to be further understood that because some of the constituent device or system components and method steps depicted in the accompanying figures may be implemented in software, or firmware, the actual connections between the device or system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

In certain embodiments, a dynamic webpage interface for an intelligent electronic device (IED) and method thereof are provided. One embodiment of an IED in accordance with the present disclosure provides for separating a webpage into multiple discrete resources and customizing the resources returned by a web server in the IED based on the contents of the request. Such a custom request may be implemented by a Web Services interface, such as, for example, content based API's like SOAP (Simple Object Access Protocol), or, for example, address and command based API's like REST (Representational State Transfer). In certain embodiments, a custom request may also be implemented by a server side processing engine in the IED, such as CGI (Common Gateway Interface), PHP (Hypertext Preprocessor), or other server side engines.

Definitions

Web Services

Web Services are an interface which allow web servers to provide function like interfaces using standard HTTP messages. Typically, a client will request a web page from a web server, which has a physical file backing it. With web services, a client can query data from the web server, without that file actually existing on the web server at the address specified, or at all. Additionally, parameters other than the page requested can be supplied to control what data is returned. Furthermore, web services may be employed to send commands to the web server. Exemplary non-limiting forms of Web Services are REST and SOAP.

REST

Representational State Transfer, or REST, is a form of Web Services which primarily uses the web address of the requested page or requested resource to control what service is accessed, and relies on the type of HTTP message, such as GET or POST, to control what action is taken. Parameters are passed to a RESTful service by the path or address used in the request. For example, a GET sent to /values would list all the values, where a GET sent to /values/1 would return the value of entry 1. A POST to /values would modify the list of values, where a POST to /values/1 would modify the value of entry 1. The primary principle of REST is to only use HTTP commands, so that it can be used by any standard interface without special processing.

SOAP

Simple Object Access Protocol, or SOAP, is a form of Web Services which uses XML embedded in the body of HTTP messages to send commands and make requests. While such a layout allows for more complex services and commands to be specified, it does require more complex processing by the client and server to properly interpret. Each command is specified as an XML node, with each parameter as a sub node.

WSDL

SOAP interfaces of web services allow for the use of an interface definition, called a Web Services Description Language, or WSDL. A WSDL file may be requested by a client, or be given directly to a client, and can be used to define how the client should interact with the web services. This includes what services may be queried, what commands may be executed, what parameters they can use, and what data formats are expected.

CGI

Common Gateway Interface, CGI, is a method used to generate dynamic content on web pages and web applications. CGI, when implemented on a web server, provides an interface between the web server and programs that generate the web content.

FastCGI

FastCGI is a binary protocol for interfacing interactive programs with a web server. FastCGI is a variation on the Common Gateway Interface (CGI); FastCGI's main aim is to reduce the overhead associated with interfacing the web server and CGI programs, allowing a server to handle more web page requests at once.

SCGI

Simple Common Gateway Interface, SCGI, is a protocol for applications to interface with HTTP servers, as an alternative to the CGI protocol. It is similar to FastCGI but is designed to be easier to implement and crucially, unlike FastCGI, practically permits CGI operations where the CGI operation has significant latency (e.g. contacting an external database).

PHP

PHP is a server-side scripting language designed for web development but also used as a general-purpose programming language. While PHP originally stood for Personal Home Page, it now stands for PHP: Hypertext Preprocessor.

Rails

Ruby on Rails, or simply Rails, is an open source web application framework written in Ruby. Rails is a model-view-controller (MVC) framework, providing default structures for a database, a web service, and web pages.

Use of Web Services to Provide Dynamic Resources

Figure 3:
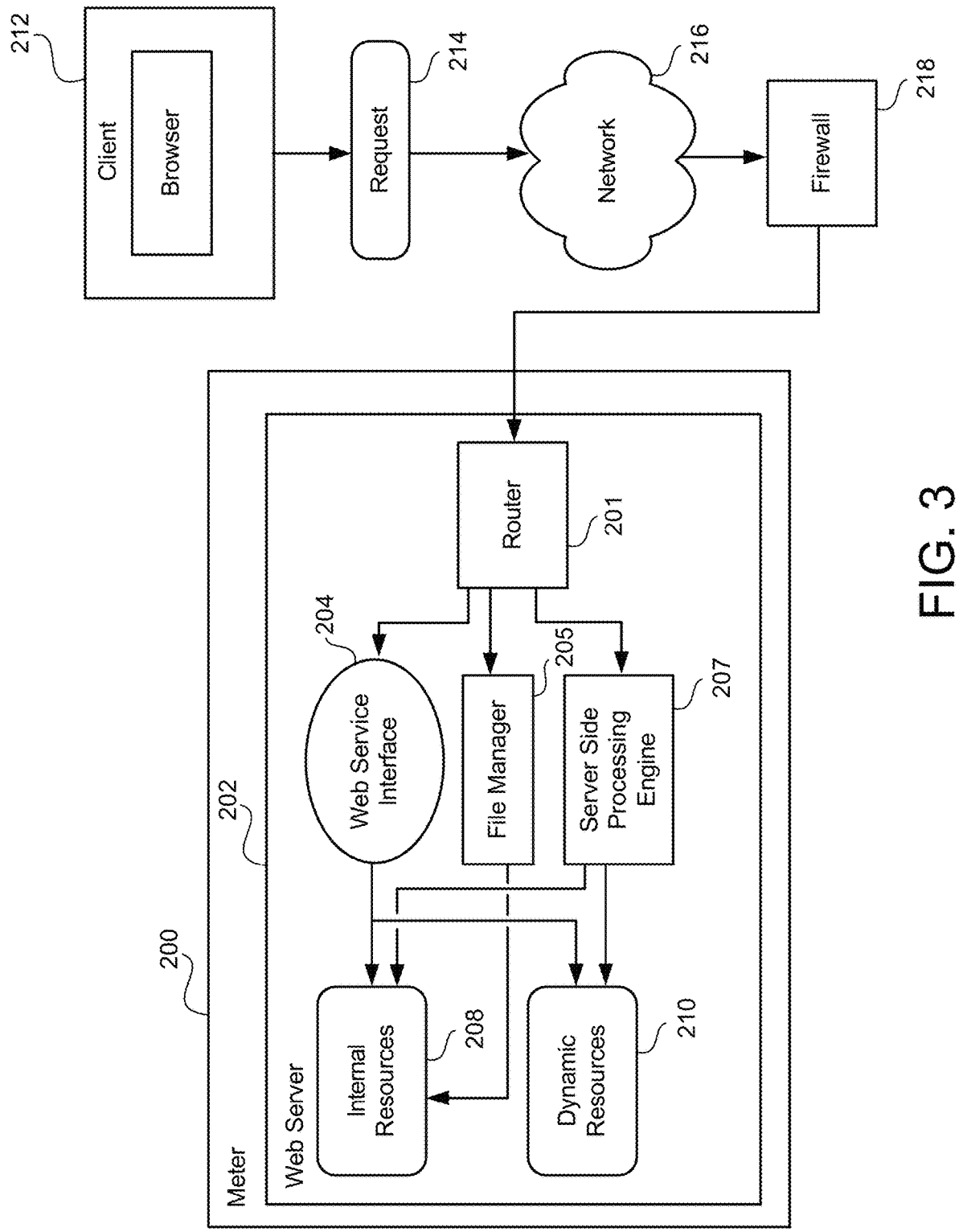
FIG. 3 illustrates an example of a client sending a request for a web page via a web service, over a network, through a firewall, and accessing internal and dynamic resources of a meter or IED in accordance with the present disclosure.

FIG. 3 illustrates a client 212 sending a request 214 for a resources (e.g., internal resources 208, dynamic resources 210) via a web service 204, over a network 216, through a firewall 218, and accessing internal and dynamic resources 208, 210 of a meter or IED 200 in accordance with the present disclosure. IED 200 includes a web server 202 configured to respond to requests for resources from a client device 212. The web server 202 includes a router 201 for routing the request 214 to an appropriate service, e.g., web service interface 204, file manager 205 and server side processing engine 207. The web services interface 204 is configured to access the internal resources 208 and dynamic resources 210 in response to requests. The web services interface 204 allows web server 202 to provide function like interfaces using standard HTTP messages. In one embodiment, a client 212 requests or queries data from the web server 202, without a file associated to a web page actually existing on the web server 202 at the address specified, or at all. The file manager 205 is configured to access the internal resources 208, e.g., static resources in response to a request, for example, for a webpage such as an html file. The server side processing engine 207 is configured to access the internal resources 208 and dynamic resources 210 in response to a request, for example, a php file.

It is to be appreciated that all arrows indicating the flow of a request shown in FIG. 3 may be bidirectional arrows indicating the return flow of a returned resource. For example, a returned dynamic resource 210 will be passed to the web service interface 204, which will subsequently send the returned resource to the client 212 via the router 201, firewall 218 and network 216. In certain embodiments, the router 201 and firewall 218 may be omitted.

It is to be appreciated that web server 202 may be executing, for example, on at least one processor of CPU 150 described above. In a further non-limiting example, the web server 202 may execute on DSP1 160 or DPS2 170, as shown in FIG. 2. It is further to be appreciated that internal resources 208 may include, but not limited to, web pages, JavaScript files, CSS, pictures, settings, fixed layout files, statically generated data files, etc., and dynamic resources 210 may include, but not limited to, web pages, JavaScript files, CSS, pictures, settings, dynamic layout files, dynamically generated data files, request specific data files, etc. In one embodiment, the internal resources 208 may be stored in non-volatile memory 120. In another embodiment, the dynamic resources 210 are generated by at least one processor and stored in volatile memory 118 until returned in response to a request. In one embodiment, resources may be stored as dynamic files in the corresponding file address. In another embodiment, the resource address could be routed to another file address. In another embodiment, the dynamic resource may be stored as a single or multiple files, which are parsed and rearranged to meet the parameters of the request.

Referring to FIG. 3, IED 200 provides dynamic resources by using the web services interface 204 via the HTTP web server 202. Initially, a client 212 generates a request 214 for a resource, e.g., a dynamic resource 210. Upon receipt by the router 201, the resources is indicated as dynamic and the request is routed to the web services interface 204. The web services interface 204 processes the parameters of the request (e.g., address, body, etc.) and determines which internal generator to use to generate the resource, for example, a DSP for measured and calculated values, a database for historical values, etc. The internal generator collects the information for the dynamic resource and generates a resultant file. The web server interface 204 then sends the resultant file to the client 212.

It is to be appreciated that a dynamic resource is any resource which is generated in response to a request, rather than having a fixed file stored in non-volatile memory. For example, the resources returned in response to a request may display the real time readings by requesting the list of the current voltage readings. As another example, a list of historical values may be displayed by requesting a list of the previous day of logged readings. As another example, the samples for a waveform may be requested, and displayed on a graph. As another example, log data may be requested in a common exchange format, such as JSON, XML, CSV, PQDIF, or COMTRADE. As another example, an analysis and summary of power quality events may be requested, without requiring all of the events involved to be transferred to the client 212 for processing. As another example, a requested value, such as energy, may be pre-formatted in the response, so that the web page 206 may display it without requiring any processing.

One benefit of using Web Services is that since they transfer via HTTP, and HTTP is commonly allowed through network security, it allows for the traversal of firewalls 218. Another benefit of Web Services is that they can be used over transports other than HTTP with little to no modifications, including Emails, FTP, and other such text address and body based protocols. Another benefit is large acceptance of Web Sockets as a method of exchanging information between servers and clients on a network, which eases integration with existing clients.

Figure 4:
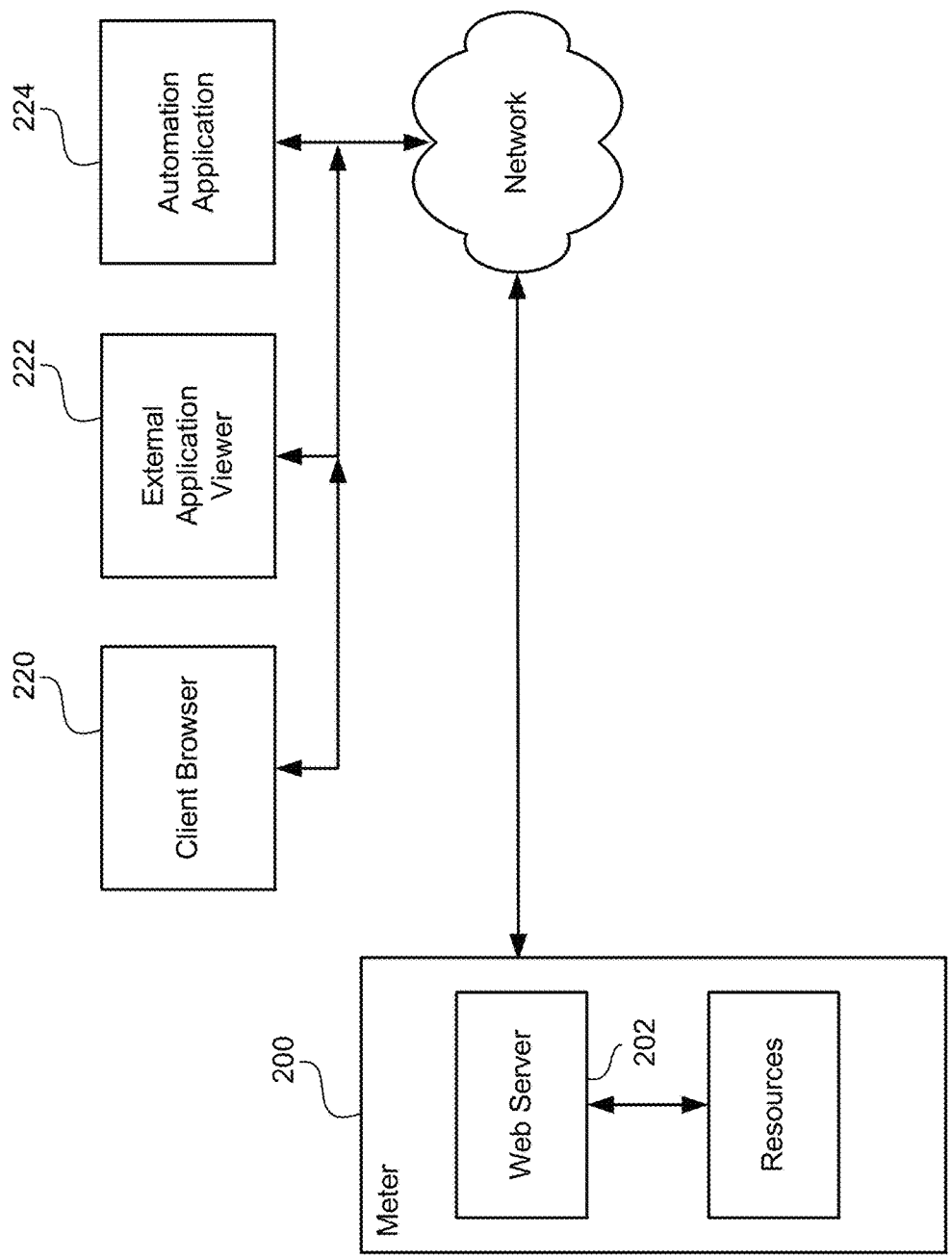
FIG. 4 illustrates an example of consumers of a web resource in accordance with the present disclosure.

Referring to FIG. 4, tt is to be appreciated that the entity requesting the dynamic resource from the web server 202 may be a web page 206 running on a client's web browser 220, a dedicated viewer application 222 running on a client, such as a computer, or a mobile device, or an automation application 224 running on a server.

In one embodiment, the web services interface 204 may be configured as a REST interface to read meter values. For example, each value of the IED 200, e.g., a meter, may be accessed through a named address, such as /readings/volts.an.avg, or /readings/watthr.recv.a. Alternatively, each value may be presented through an indexed address, such as /readings/2/4, perhaps representing neutral current. It is to be appreciated that the named address may be requested via a client browser by entering the request in an address bar for the particular meter or IED, for example, http://www.meter101.com/readings/volts.an.avg".

The returned resource in one example may be an html formatted display, such as <html><body>Voltage AN=120.3</body></html>. The returned resource may also be a json file, such as {"volts.an.avg": {"name": "Voltage AN", "value": 120.3} }. The returned resource may also be an xml file, such as <values><volts.an.avg name="Voltage AN" value="120.3"/></values>. The returned resource may also just be the raw value, in text or binary. It is to be appreciated that the formatting of the returned resource may either be hard coded as part of designing the interface, or it may be a parameter in the request.

Such a REST interface may also be configured to read a list of meter values. It is to be appreciated that the list of the returned resource may either be affixed hard coded list as part of designing the interface, or it may be a parameter in the request. In one non-limiting example, a group of meter values may be accessed through a named address, such as /readings/volts, where the returned response is a list of all the current voltage values, such as volts an, bn, and cn. As another non-limiting example, such a group may include multiple types of values, such as /readings/realtime, which may include all the real time voltage, current, frequency, power, and other such values. As another non-limiting example, /readings may return a list of all the current values of all the readings the meter supports. As another non-limiting example, /readings/harmonics/volts.an may return a list of all the recorded harmonics for the voltage an channel.

Such a REST interface may also be configured to read a historical list of meter values and events. For example, /history/volts.an may return a list of all volts an values recorded by the meter. As another example, /events/pq/volts.an may return a list of all Power Quality events which were recorded on the Volts AN channel. Similarly, /events/pq may return all the power quality events which were recorded on all channels. As another example, the waveform events may be referenced by time, such as /events/waveform/20130828, which would return a list of all waveform captures which occurred on 2013 Aug. 28. Such a response may be just a list of event information, or it may also include the actual sample data of the capture. Similarly, an event may be referenced directly by its index, such as /events/waveform/0x12345678, which may be used to get the sample data for capture 0x12345678. Such non-limiting examples should be taken as possibilities, and is by no means exhaustive. Many other permutations of addresses and response formats are envisioned to be within the scope of the present disclosure.

The returned resource for lists may be improved by rearranging the data to represent it as simple lists, and including the descriptive information in a header. It is to be appreciated that the formatting of the list may either be hard coded as part of designing the interface, or it may be a parameter in the request. For example, a list of Volts AN values may be specified in a json file as {"volts.an": {"description": {"name": "Voltage AN" } "value": {120.3, 120.2, 120.33, 130.7} } "time": {"2013/08/28 12:00", "2013/08/28 12:15", "2013/08/28 12:30", "2013/08/28 12:45" } }.

In another embodiment, the web services interface 204 may be configured as a SOAP interface to read meter values. In this embodiment, the request is formatted via an application, where the application may be a web page stored in the IED or the application may be a fixed application installed on the client device. For example, each value of the meter may be referenced by a name, and a SOAP GET request may be made for /readings, where the SOAP body contains the name of the value requested, such as <m:GetValue><m:Value>volts.an</m:Value></m:GetValue>. As another example, a list of such values may be retrieved by specifying each value to read, such as <m:GetValue><m:Value>volts.an</m:Value><m:Value>volts.bn</m:Value><m:Value>volts.cn</m:Value></m:GetValue>. As another example, Power Quality events may be retrieved by specifying the function to get PQ events, and the channel to get the events for, such as <m:GetPQ><m:Value>volts.an</m:Value></m:GetPQ>.

The exemplary SOAP interface of the present disclosure may be extended to also specify additional parameters to control what values are returned. For example, a history of values may be requested for Volts AN for all of August 2013, by specifying <m:TimeStart>2013/08/01</m:TimeStart><m:TimeEnd>2013/09/01</m:TimeEnd> to <m:GetValue>.

Such additional parameters may be extended to also specify the format of the data returned. For example, <m:Output><m:File>JSON</m:File></m:Output> may be specified to return the results as a JSON file rather than an Xml file. Other output transforms are also considered, including Xml, CSV, plain text, PQDIF, COMTRADE, binary formats, and HTML. As another example, all the values may be specified to be formatted to a specific scale, such as for energy the value may be formatted as 000000.00 kWh.

Such a SOAP interface may be extended to include other functions, to provide analysis and metrics over the values contained within the meter. For example, a function may be used to get the max value, along with the timestamp of its occurrence, over a historical range of values. As another example, the difference between the first and last values of an accumulator, such as energy, may be requested over a historical range of values.

Multiple such functions and parameters may be combined, so that the requestor may have complete control over the layout of the returned resource. For example, the accumulator values for each of the pulse inputs of the meter may be requested for a particular month, the sum accumulation over that month stored, and a list of the first, last, max, and sum values returned for each value, in a CSV table. Such a returned resource may then be transformed via JavaScript into a table to be displayed on a webpage, or returned as a file to be saved by the client, or returned directly to an external software.

Such formatting may be improved by providing a formatting template along with the request. Such a formatting template may contain placeholders for the values to be returned, along with control codes for things like repeating lines. For example, the formatting template <value:foreach>

[time], [first], [last], [dff], [max.value], [max.time] \n</value:foreach> may be used to output an energy report in CSV.

SOAP Web Services typically publish a Web Services Description Language, or WSDL, file so that other applications can automatically map the functions and resources available on the web server. In one embodiment, a WSDL file is stored in memory, e.g., memory 120, to list each of the values, such as logs, readings, output formats, and request parameters, available on the IED or meter 200. This would allow a client to dynamically react to each meter individually, as features are added and removed.

In another embodiment, a descriptor list may be used to provide a SOAP function or address which returns a list of each of the available resources, such as logs, readings, output formats, or request parameters. For example, sending a SOAP GET request to /features, with the function <m:Enumerate> Logs </m:Enumerate>, may return a list of all logs available. As another example, requesting <m:Enumerate> Readings </m:Enumerate>, may return a list of all readings available. Such a request may also be performed via a REST interface, such as sending a GET request to /features/enumerate/logs, or /features/enumerate/readings.

Other similar protocols are envisioned, including JSON-RPC, JSON-WSP, and XML-RPC. It is also envisioned that any feature described for SOAP services may be implemented using REST, or another similar protocol, and vice-versa.

As described above, the server side processing engine 207 is provided to handle the request for a resource, e.g., a dynamic resource. For example, a PHP, Python, or Ruby engine may be used to generate dynamic content, based off of scripted pages and parameters passed as part of the address and POST backs.

It is appreciated that Web Services may be implemented by using such a server side processing engine 207, as well as coding the engine directly into the web server 202. It is also appreciated that the server side processing engine may be implemented using a CGI interface, a FastCGI interface, a SCGI interface, or by compiling the source code directly in as a module of the web server.

A REST type interface may be further improved by also supporting parameters to be specified in the body of the GET request, using a format such as SOAP. For example, the historical log of Volts AN values may be retrieved via the REST interface /history/volts.an, and parameters such as time range may be specified in the body, such as <m:TimeStart>2013/08/01</m:TimeStart><m:TimeEnd>2013/09/01</m:TimeEnd>.

A REST type interface may be further extended by shortening or obfuscating the paths to the web services. Descriptive addresses are typically used for ease of use by humans. Data transferred can be reduced by shortening the names. Also, interfaces can be made harder to reverse engineer by providing unintelligible or misleading names for resources. For example, /readings/volts.an may be replaced by /a/14445. As another example, /logs/waveform/compress may be /17/b/volts.an.

Security and preventing reverse engineering may be further improved by dynamically generating address components, which would prevent blind searching of addresses for features. One implementation of this may be permute the address by the time, such as multiplying the field index by the day of month. Another non-limiting example would be to include the permute key in the body of another request. In such an example, the client browser 212 would request resource A, which would contain the permute key B, then use permute key B to generate the resource address C.

Another embodiment of dynamic web service addresses is to use the login identity key of the current user as part of the dynamic address. When the web service request is made, such an address may be verified against the current login session of the requestor, to ensure that the requestor is actually valid. For example, the user name may be included as part of the path, such as /userA/readings/volts.an. If userB requested /userA/readings/volts.an, or if userA requested the same address when not logged in, the request would be rejected. As another example, a unique key may be generated for the client when the client logs in, and returned in the successful login request. Such a login key may then be used as part of address.

Another embodiment of using login keys for dynamic web service addresses may be to permute the address by the user key. For example, the address may be encrypted using the user id as the encryption key. As another example, the login key of the user session may be used.

Another embodiment of dynamic web service addresses is to encrypt the entire request address, For example, the resource /readings/volts.an may be encrypted as /15DY8-EU1X6-DK38F-QQYUI-4729G, which would then be decrypted by the web server 202 to determine the resource requested. It is appreciated that such an encryption may also contain dynamically generated content, such as dates and user keys, which would also be verified by the server.

It is appreciated that such security measures may be able to be enabled and disabled by an administrative user. It is also appreciated that such features may be hard coded in the web server 202, to prevent reverse engineering.

Transport Security and Optimization

Figure 5:
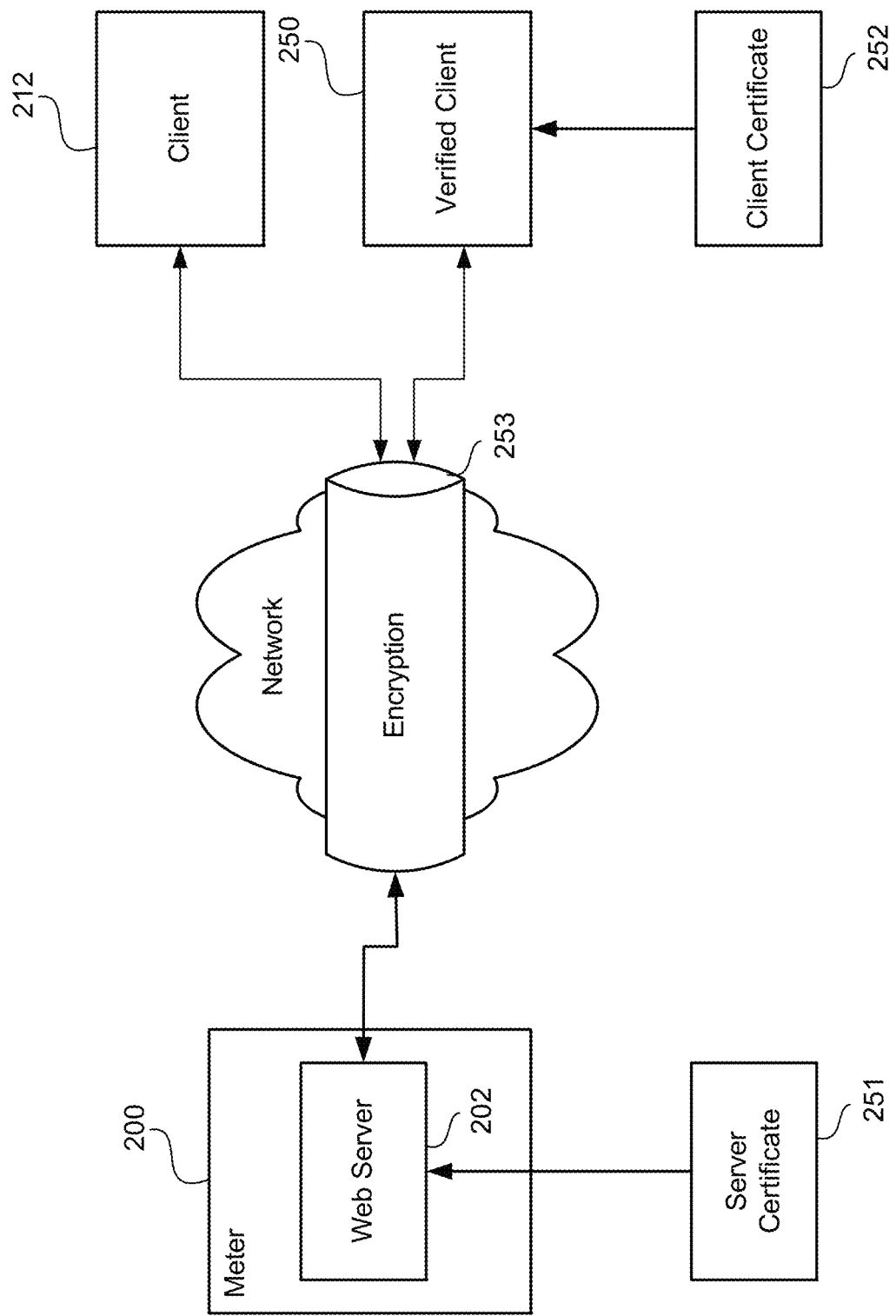
FIG. 5 illustrates an example of encrypted communications tunneling though a network, with server and client certificate verification in accordance with the present disclosure.

Security is becoming a major issue with meters. One method of providing security is to encrypt the communications 253 between the web server 202 of IED 200 and the client 212, as shown in FIG. 5. This ensures that both the client 212 and web server 202 can be confident that the messages being passed between each have not been intercepted and modified before being delivered.

In one embodiment, the encryption is enabled by the use of web services via HTTPS instead of HTTP as the transport protocol. Because HTTPS is just an encrypted version of HTTP, the web server 202 can support web services over both with little to no change. For example, a REST interface may be used, accessed at http://1.2.3.4/readings/watthr.recv. If a secure version was required, the web server 202 would only need to run a HTTPS service, for example on port 443, and the client 212 may securely access the readings on https://1.2.3.4/readings/watthr.recv. Additionally, a certificate 251 of the web server 202 allows the client 212 to be assured that the server is legitimate. It is appreciated that HTTPS may be used for securing other web resources, not just Web Service supplied resources.

HTTPS may use Secure Socket Layer, or SSL, for its encryption, or it may use Transport Layer Security, or TLS. However, these cryptographic connections may also be used for other protocols. For example, Modbus TCP communications may be encrypted using TLS connections. As another example, SMTP exchanges may be encrypted using TLS connections. As another example, FTP may be encrypted using TLS connections. Since such cryptographic connections encrypt the contents being transferred, such a method may be used to secure any transferred protocol, assuming both sides were capable of performing the TLS handshake.

The use of encrypted connections such as TLS for security may be further improved by using client authentication. Where normally a TLS connection requires that a web server verify its identity with a certificate, client authentication also requires that the Client 250 supply a certificate 252 to the web server 202. This improves security by allowing the web server 202 to be assured that the connecting client is legitimate. For example, a legitimate client 250 may have a certificate 252 installed. When the client 250 connects to the web server 202, the web server 202 challenges the client 250 for authentication. In response, the client 250 would send the certificate 252 back to the web server 202, which would then validate it. If validated, the client 250 would be allowed to continue. Otherwise the connection would be closed.

As the user may not want to give the security certificate to every client, the use of client authentication may be improved by requiring authentication only for web pages which are designated as critical or high security. For example, pages such as meter configuration, log resets, or relay control. As another example, only designated clients may be allowed to retrieve logs. As another example, the user may be given the option of which pages require authentication.

The use of authentication may be further improved by allowing the user to designate their own certificates and certificate signatures. A certificate signature may be a specific certificate, or it may be a unique field in the certificate, such as the certificate fingerprint, the issued to common name, organization, or serial number. For example, the user may upload a server certificate of their own to the meter. As another example, the user may upload a client certificate requirement, such that they may control which clients were allowed to connect.

The use of client authentication may be further improved by allowing the user to specify different client certificate requirements for different pages and interfaces, including multiple requirements for a single page. For example, the user may designate that one client is allowed to configure the meter, another client is allowed to control relays, and three separate clients are allowed to retrieve logs. As another example, 5 pages may be configured such that each page shows the accumulations and historical trends for a different digital input. Each page may then be assigned a different client certificate, such that each page may be segregated to customer, so that each may not see the data of the other.

With the proliferation of mobile user devices and cellular modems for wirelessly communicating with remote meters, it is important to reduce the size of data being transferred between the meter and the client device, as well as increase the speed of the transfer.

One solution is to reduce the amount of data returned. In one embodiment, the IED 200 only returns the data that is directly required by the requestor. For example, a realtime readings page may only require voltage, current, and frequency. The data resource returned may be stripped down to just those values, to minimize transfer. As another example, a page that shows a graph of the voltage values over the last hour may not need the timestamps of each entry, only the values, so those may be left out of the response.

Another embodiment of reducing the data returned may be to artificially reduce the resolution of the data returned, so as to minimize the data transferred. For example, when reading voltages, while the value may be accurate out to 5 decimal places, only 1 decimal place may be returned, so as to minimize the characters. Another example may be to scale very large values, such as scaling 14400 volts to 14.4, and return a scale factor along with the other values.

Another embodiment of reducing the data returned may be to strip out all the unnecessary characters in the response, often called minification. For example, all the unnecessary whitespace may be removed from the resource. As another example, JSON and XML files often use descriptive names for nodes, such as {values: { . . . } } or <values> . . . </values>. Such names may be replaced with shorted versions, such as {v:{ . . . }} or <v> . . . </v>. This would require that the page requesting the resource know about the shorted names.

Another embodiment of reducing the data returned may be to compress the data of the response. For example, HTTP compression may be used to compress the data section of the HTTP response with gzip, lzma, bzip2, deflate, compress, or a custom compression algorithm. As another example, the entire message may be compressed, where the recipient knows the method to decompress the message beforehand. As another non-limiting example, the entire transport layer, and all the messages between the client and web server, may be compressed, such as using TLS compression. Such compression may be performed automatically by the webserver itself, or by the web service provider on specific resources.

In addition to reducing the size of data transferred, a page can be loaded by a browser faster by requesting each of the resources in parallel, while the page is being rendered. Let this be the called Delayed Load of resources. For example, a web page may be composed of a simple page, and each picture on the page may be retrieved in parallel, and shown when ready. As another example, a widget on the page, such as a waveform graph may be loaded in parallel with the resources to render in the graph, after the main page has been loaded. In such an instance, a simple page with navigation options may be displayed, and when the waveform graph resources are available, they would be rendered by the client browser, and displayed. It is envisioned that such an example may be further extended to loading and showing many such graphs, or other data, such as data tables, settings, or other information. As another example, JavaScript libraries may be delay loaded.

Delayed loading of individual resources may be further extended to only request the resources when needed. For example, when a web page is rendered by the client browser, only a portion of the web page is displayed. Since resources which are not on screen at the time of rendering are not shown, the request for those resources may be delayed until the user scrolls the client browser display to show them. As another example, a list of items, such as a table, widgets, or graphs, may be displayed, and as the user scrolls down the table, the new entries to be shown are loaded and displayed as they become available. In such an example, the length of the table may continuously grow, allowing a single table to be used to navigate through all the items, rather than paging between ranges.

In addition to dynamically loading page resources, page resources may also be dynamically unloaded, to save on resources, such as processing time, or memory, in the client browser. For example, a picture or widget which has gone off screen may be unloaded. As another example, in an endless table as described before, the earlier entries in the table may be unloaded. One embodiment of dynamic unloading may be to encapsulate each resource in a JavaScript object, and when its not needed any more, it may be disposed of. Another may embodiment is to remove the DOM object which represents the resource through JavaScript.

Some resources may require other resources to have been loaded first to be used properly. For example, JavaScript library A may require that JavaScript library B have been loaded before library A can be used. In one embodiment, a delay loop is placed in the processing of each resource, such as JavaScript libraries, that waits until the required libraries have been loaded. In a further embodiment, a JavaScript library may be used to perform the loading of resources. In such an instance, each of the functions and resources which have an external requirement may be marked as such, and the loading library, such as RequireJS, may perform the blocking delay for the action.

Triggering Actions (Remote Procedure Call)

Web Services can be used for more than just querying data. When the meter receives a web services request, an action may be performed, often called Remote Procedure Calls. For example, a request for log data may pause the logs to prevent the data from being corrupted. As another example, the meter may record that the log was retrieved, the user that performed that action, the source IP address, along with other information. As another example, a relay may be controlled by writing to a web service interface. As another example, settings such as communications, log configuration, security settings, or page configurations, may be changed by writing the settings to a web service interface. As another example, a meter maintenance action, such as resetting logs, resetting energy or input accumulators, compressing data such as logs internally, checking for and updating meter firmware and software, or resetting the meter, may be performed.

Performing an action in response to a web service may be improved by performing actions in addition to the service specified. For example, when a settings update is performed, an email may be sent to a preconfigured recipient, notifying them of the change.

One embodiment of Remote Procedure Calls (RPC) using web services is for the client to send an HTML POST message to a specific address, such as in a REST query. For example, a POST message may be sent to /actions/reset/logs/waveform to clear the waveform logs. In such an example, the action is /actions/reset, where logs and waveform are parameters to the action. As another example, /io/relay/14/NO may be used to set relay 14 of the 10 subsystem to Normally Open.

Another embodiment of RPC using web services is to use the same addressing scheme, but to include parameters in the body of the post. For example, /io/relay/14 may be set to Normally Closed by sending a POST message, where the body contains the string "NC". As another example, the waveform, pq, and alarm logs may be reset by posting a list of those three, such as <m:Log> Waveform </m:Log><m:Log> PQ</m:Log><m:Log> Alarm </m:Log>, to /logs/reset. As another example, firmware may be updated by sending a POST message containing the binary of the firmware to /sys/firmware.

Another embodiment of RPC using web services is to use SOAP style actions specified in the body of a POST message. For example, a sequence of updating firmware, resetting logs, and resetting the meter, may be performed by sending a list of commands to execute in sequential order, such as <m:UpdateFirmware> http://12.23.34.45</m:UpdateFirmware><m:Reset><m:Logs> All </m:Logs></m:Reset><m:Reset><m:Meter> Hard </m:Meter></m:Reset>. Previously given examples may also be implemented this way. As another example, the meter may be commanded to analyze and upload COMTRADE files to a server by sending a POST message to /logs/waveform, with the body <m:Convert><m:Format> COMTRADE </m:Format><m:Log> Waveform </m:Log><m:TimeStart>2013/08/01</m:TimeStart><m:TimeEnd>2013/09/01</m:TimeEnd><m:Upload><m:Address> ftp://11.22.33.44/meter/comtrade </m:Address></m:Upload></m:Convert>.

Another embodiment of RPC using web services is to trigger off a GET request. The request may be to a command address, the same as with a POST message, or it may be a standard GET request for a resource, that triggers another action. For example, a GET request may be sent to /logs/compress/volts.an, which would send back a web page that gives feedback progress for a background process compressing the Volts AN historical records for long term storage. In this case, the request to the page triggered the compress action, and the GET response was the feedback webpage. As another example, under normal circumstances, the meters internal update rate may be once every 15 second. Reading the real time readings may trigger the meter to increase its update rate to once every 100 ms for a short period, thus increasing the temporal accuracy of the data.

It is appreciated that such RPC commands may be individually restricted to only authorized users, such as using login states, key parameters in addresses and arguments, transport security, and certificates.

External parameters can be faked and incorrectly supplied, both due to error and intentional misuse. While validation of parameters can help, bugs may still occur, which can allow the web server code to be exploited or accidently cause unintended side effects. In one embodiment, the IED separates the processing of the message and parameters, from the actual execution of the action. Then the message processor, such as the web server, may be restricted from executing secure actions, such as resets or configuration changes. This would prevent a malformed message from causing unintended side effects.

Figure 6:
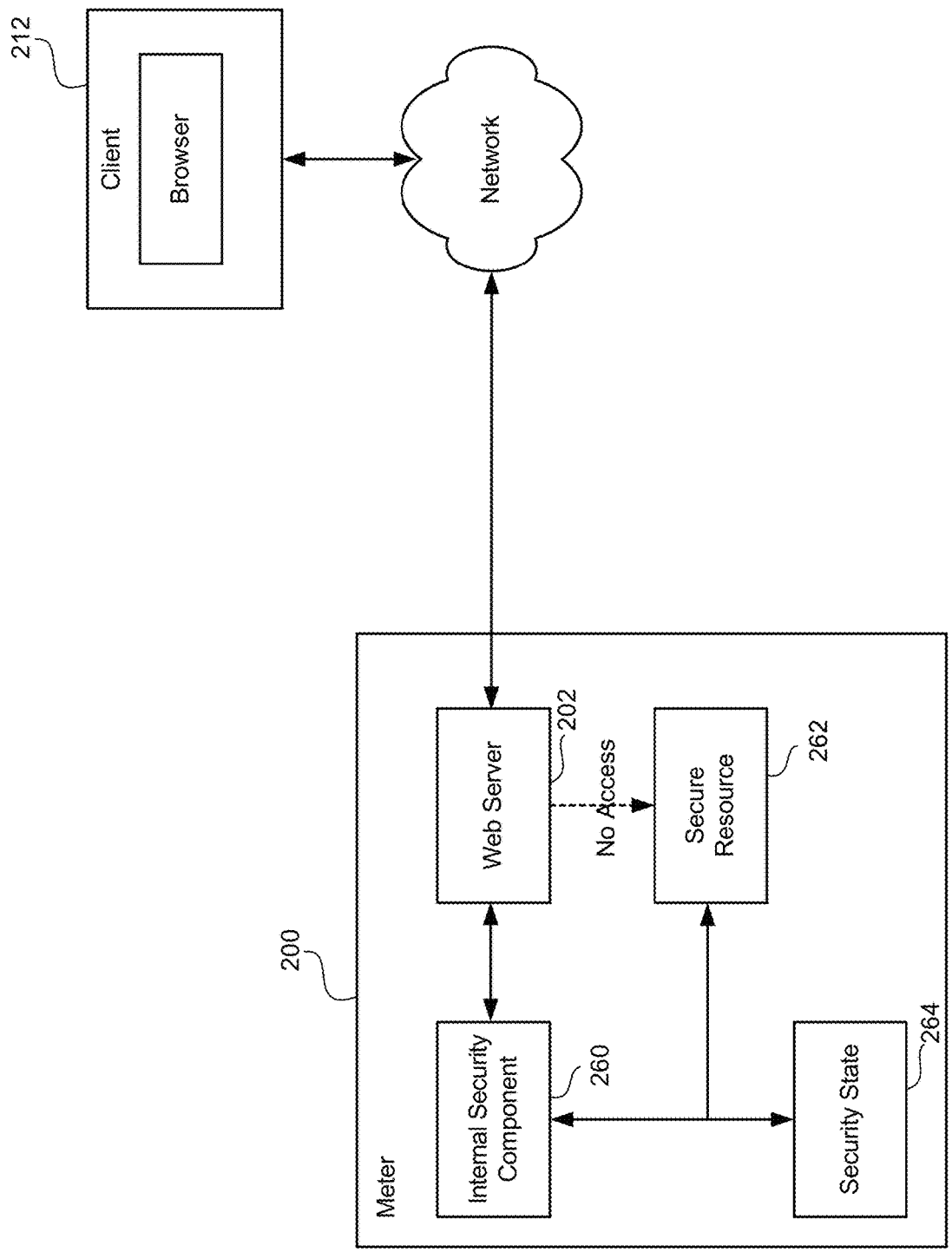
FIG. 6 is an example of functional separation security in accordance with the present disclosure.

For example, referring to FIG. 6, the web server component 202 of the meter 200 may receive a message requesting a reset from client 212. The web server 202 parses the parameters to do the reset, validates them, and passes the command on to an internal security component 260 that has permission to actually perform the action. As another example, a malformed request for historical logs may contain an exploit that overruns the internal buffers of the web server. Because the web server 202 does not contain the ability to execute any secure action, it may crash, but it would be much harder to trigger a secure action. As another example, a request for a secure resource 262, such as the list of users, may be passed through the internal security component 260, such that the requestor [5.5] must first login. When the resource is requested, if the requestor 212 is not in the list of allowed users 264 for that resource 262, the request is denied. Since the web server 202 doesn't have access to the security list 264, it cannot be exploited to access it.

State Based Interfaces

With dynamic resources, the resources and actual pages returned can be changed based on the current internal state of the meter, such as what user is requesting the resource, how another resource has been configured, what pq or system events have occurred recently, if a physical switch such as a sealing switch is pressed, or other such internal events or states.

One embodiment of state based resources would be to return resources based on the current logged in state of the user. For example, if the user is not logged in, any request to a secure resource may return the login page. As another example, a request to a configuration page may return a not available page if the user doesn't have permission to view configurations. As another example, a request to a configuration page may return the configurations as just read only values, with no ability to change them, if the user doesn't have permission to change configurations. As another example, a request for the system events log may exclude login attempts in the log if the user does not have permissions to view those, and include them if they do. As another example, the current status and name of the logged in user may be returned as a resource on all pages, such as in the upper right corner. As another example, if the user is not logged in or does not have permission to request a resource, such as logs or energy readings, a standard 404 Not Found response may be returned, as if the page did not exist, to prevent scanning the interfaces.

Another embodiment of state based resources would be to customize the resource returned based on a configuration resource. For example, when requesting the historical logs of volts an, a configuration file may be used to specify the default format of the response. As another example, a configuration file may be used to enable or disable the availability of a resource. As another example, all the labels on a page may be loaded from a resource, and the language of that resource may be configured, allowing for a language localized page. This may also be used for format localization, such as displaying numbers using a decimal '.', or comma ',', to separate whole from fractional numbers.

Customized resources may be further improved by using them to dynamically change the layout of the web pages returned. For example, a real time readings page may be configured by the user to include readings of their choice. As another example, a reading may be configured to be displayed as a number, a gauge, a bar, a trend graph for a configured period, or a textual description, such as representing phase order as ABC or ACB. As another example, colors, fonts, and layout of the web page may be controlled through a configuration.

Such configured web pages may be used to create user configured dashboard web pages of meter information. Let each component displayed on the dashboard be called a Widget. For example, the user may configure a page to include voltage, current, frequency, and energy readings on a page. As another example, the page may include a list of all the system events which occurred in the last hour. As another example, the page may include a graph of the last second of waveform samples. As another example, the page may include a list of the last 5 PQ events. As another example, the page may include a graph of the last 10 minutes of voltage values. As another example, the page may include a graphic indicating the current states of the alarm limits as colors or images. As another example, the page may include links to other meter information pages, configured by the user. It is envisioned that any combination of such configurations may be made on the same page, as well as the layout being configurable, and that other such widgets may be included.

Such configured web pages may be configured externally, by exporting the configuration file as a queryable resource, then uploaded back as a writable resource to store it for use. Such an external configuration file may be a binary file, modified by a editor software. Such a file could also be a text file, such as xml, csv, css, html, json, ini, php, or plain text. A text file could be configured with a software, or it could be edited directly with a text editor.

Such configured web pages may also be configured directly in the web browser, using JavaScript to manipulate the locations and types of widgets. Such configuration would be stored local to the client until they decided to save it, at which time, it would POST the configuration back to the meter, which would then store it. Such configuration may also be directly manipulated by sending web service commands back to the web server, which would update the configuration, and refreshing the display on the page.

Another embodiment of state based resources would be to customize the resource returned based on which user requested the resource. For example, each user may have a different default response format for queried data. As another example, each user may configure a different dashboard. As another example, the first page the user sees when navigating to the meter via web, also known as the home page, may be different for each user. As another example, the entire collection of web pages, or web site, may be different for each user. This difference may be look and feel, such as fonts, colors, or localization, or may be structural. Structural differences would include changing what pages are available, what links are available to navigate between pages, and the layout of pages. As another example, a different page may be returned for a specific resource for each user. In this example, a page displaying system information may display just the current status of the meter for one user, the configuration of the meter for another, and detailed information about the current internal state of the meter, such as process information, cpu and memory usage, network usage, and other such internal information, for another user.

Another use of customizing resources on a per user basis is to only present information that is relevant to that user. In one embodiment, a category or group is assigned to a user, which describes what role they have with the meter. For example, one user may be assigned to the administrative role, which may present debugging and configuration pages for the user when they log in. As another example, a user may be assigned to the energy viewer role, which may present them with an interface customized to viewing energy and usage values. As another example, a user may be assigned to the maintenance role, which may present them with real time readings such as voltage, current, frequency, and power, as well as lists of power quality and limit events.

Dynamic JavaScript Generation

In addition to returning dynamic web pages, the dynamic nature of a web page may be controlled by the JavaScript that manipulates the page. As a non-limiting example, a button may be shown or hidden by the javascript. As another non-limiting example, the location of a grid or a value label, may be changed by the javascript. As another example, JavaScript may be used to determine which resource file to request. As another example, JavaScript may control the parameters of the web service resource request, such as historical readings, determining what values are returned, such as which channels, and what time range.

In one embodiment, the JavaScript itself comes from a web service, such that only the code which was required for the requesting user or page, is returned. For example, different browsers and browser versions require different JavaScript, as there is a wide variety of implementations of JavaScript processing. In such a case, JavaScript files may be implemented to provide the same functionality to different browsers and versions, and only the one required for the requesting browser would be returned. As another example, a page may be composed of two JavaScript references, one for the loading and processing code, and another for the resource references. This may help keep the resource references hidden to help deter reverse engineering of the interface. As another example, a page may be composed of one JavaScript reference, which dynamically loads other JavaScript scripts from dynamically generated addresses.

Another embodiment of dynamically generated JavaScript may be to dynamically obfuscate the script returned on each request. For example, different variable replacements may be performed on each request: The resultant code would operate the same, but look different on each request. As another example, additional, non-functional, code may be inserted on each request. As another example, the order of the variables and functions may be dynamically rearranged on each request.

Another embodiment of dynamically generated JavaScript may be to dynamically generate the code used to request changing resource paths, such that if the same javascript were executed by another client session, or at another time, it would not operate. For example, the path to a web service resource may be generated to conform to only the resources available for the current user session. As another example, the javascript to parse a resource request, such as JSON, may be dynamically generated. In addition, the format and names of variables in the requested resource may be dynamically changed to match. In such an instance, the dynamically generated javascript and resource would have to be paired to be usable by a client.

Modern browsers cache resources to improve performance and network traffic. Dynamically obfuscated JavaScript may also be configured to only change once a day, to minimize the performance impact on the client.

Limiters to Improve Performance

Dynamic generation of resources can put load on the meter, both in cpu and memory usage, which may decrease the performance of other components of the system. In one embodiment to minimize the decrease in performance, limits are placed on how many concurrent dynamic requests can be made. For example, if the number of requests per second exceeds a limit, such as 10, requests after that may be delayed. If the backlog of requests exceeds another limit, new requests may be denied completely. As another example, some requests, such as collecting waveform samples, may take significantly more processing then generating a user specific page. A queuing system may be used that allows simple requests to be processed first. Alternatively, a combination of limits and weighting may be used, where a simple request has a weight of 1 towards the upper limit of requests, and a waveform sample file request has a weight of 5. As another example, a limit on requests may be controlled by the number of concurrent users interacting with the system. As another example, the load on the system may be measured, using metrics such as file access, cpu usage, memory usage, or byte communicated over the network, and transformed into a load percentage. That percentage may then be used to limit requests.

In a further embodiment, frequent requests, or components of requests, are cache so that they can be built quicker and with less load on the system. For example, a request for a user dashboard page may not change on the fly or frequently, so the HTML of the dynamic page may be cached on a long term storage media. As another example, a request for waveform samples in a csv format may be cached on the first request, and further requests would pull from that cached file. As another example, requests for the historical values of a channel, such as volts an, in a JSON format and in the range of a year, may be broken into multiple sub-caches of values, such as by day. Then that year range may be built up from those day caches, and when a request for a different range is made, such as a month within that year, processing can be simplified by just building from the cached files.

Cached files may be stored either in short term memory, such as RAM, or long term memory, such as compact flash or other non-volatile storage device, both of which are limited resources. To prevent memory from being wasted on storing caches that are no longer used, a management table may be kept, that keeps track of factors such as how long ago the cache file was last used, a rating on how commonly it is read, a rating on how much computation it takes to generate, as well as the size of the cached file. A limit can then be placed on cache usage, and when the limit is exceeded, less useful cache files can be removed to make space for new files.

Figure 7A:
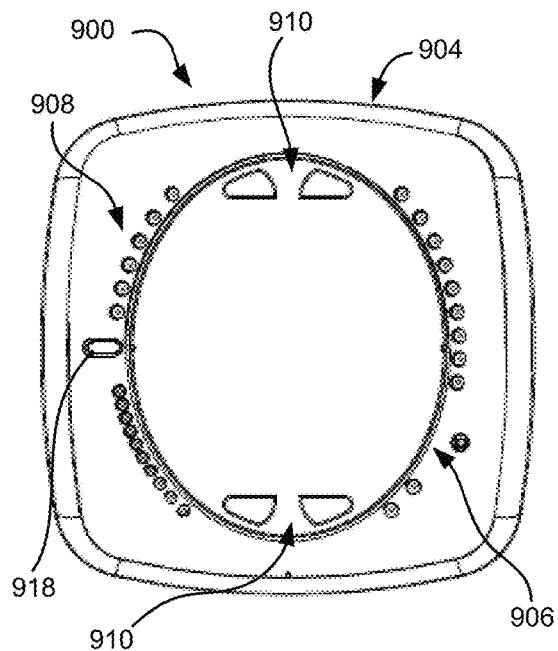
Figure 7B:
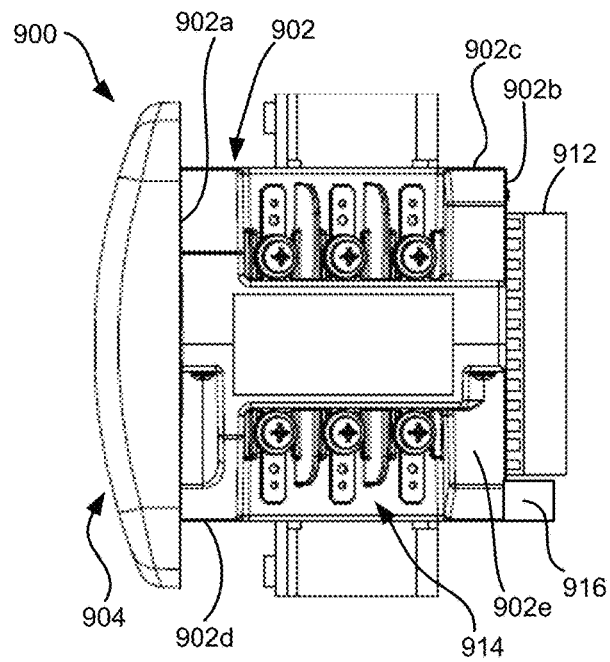

It is to be appreciated that the meter, or intelligent electronic device, shown and described in FIGS. 2-6 may take various forms and still be within the scope of the present disclosure. Furthermore, it is to be appreciated that the components and devices of the IEDs 110, 200 shown and described in relation to FIGS. 2-6 may be disposed in various housings depending on the application or environment. For example, the IED 110, 200 may be configured as a panel meter 900 as shown in FIGS. 7A and 7B. The panel meter 900 of FIGS. 7A and 7B is described in more detail in commonly owned U.S. Pat. No. 7,271,996, the contents of which are hereby incorporated by reference. As seen in FIGS. 7A and 7B, the IED 900 includes a housing 902 defining a front surface 902a, a rear surface 902b, a top surface 902c, a bottom surface 902d, a right side surface 902e, and a left side surface (not shown). Electrical device 900 includes a face plate 904 operatively connected to front surface 902a of housing 902. Face plate 904 includes displays 906, indicators 908 (e.g., LEDs and the like), buttons 910, and the like providing a user with an interface for visualization and operation of electrical device 900. For example, as seen in FIG. 7A, face plate 904 of electrical device 900 includes analog and/or digital displays 906 capable of producing alphanumeric characters. Face plate 904 includes a plurality of indicators 908 which, when illuminated, indicate to the user the "type of reading", the "% of load bar", the "parameter designation" which indicates the reading which is being displayed on displays 906, a "scale selector" (e.g., Kilo or Mega multiplier of Displayed Readings), etc. Face plate 904 includes a plurality of buttons 910 (e.g., a "menu" button, an "enter" button, a "down" button, a "right" button, etc.) for performing a plurality of functions, including and not limited to: viewing of meter information; enter display modes; configuring parameters; performing re-sets; performing LED checks; changing settings; viewing parameter values; scrolling parameter values; and viewing limit states. The housing 902 includes voltage connections or inputs 912 provided on rear surface 902b thereof, and current inputs 914 provided along right side surface 902e thereof. The IED 900 may include a first interface or communication port 916 for connection to a master and/or slave device. Desirably, first communication port 916 is situated in rear surface 902b of housing 902. IED 900 may also include a second interface or communication port 918 situated on face plate 904.

Figure 7C:
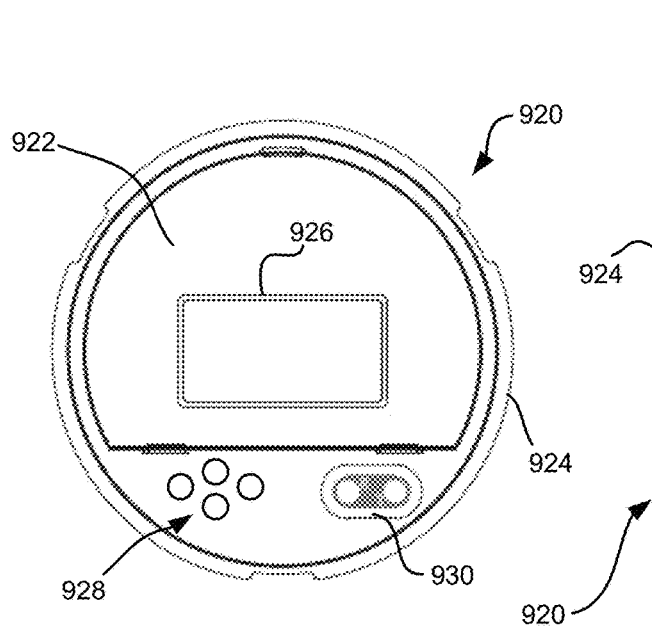
Figure 7D:
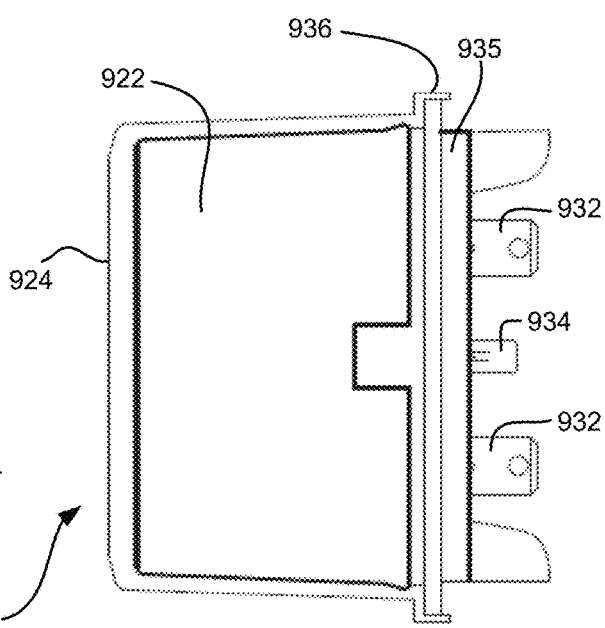

In other embodiment, the IED 110, 200 may be configured as a socket meter 920, also known as a S-base type meter or type S meter, as shown in FIGS. 7C and 7D. The socket meter 920 of FIGS. 7C and 7D is described in more detail in commonly owned application Ser. No. 12/578,062 (U.S. Publication No. 2010/0090680), the contents of which are hereby incorporated by reference. Referring to FIGS. 7C and 7D, the meter 920 includes a main housing 922 surrounded by a cover 924. The cover 924 is preferably made of a clear material to expose a display 926 disposed on the main body 922. An interface 928 to access the display and a communication port 930 is also provided and accessible through the cover 924. The meter 920 further includes a plurality of current terminals 932 and voltage terminals 934 disposed on backside of the meter extending through a base 935. The terminals 932, 934 are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring 936 is used as a seal between the meter 920 and/or cover 924 and the meter socket to prevent removal of the meter and to indicate tampering with the meter.

Figure 7F:
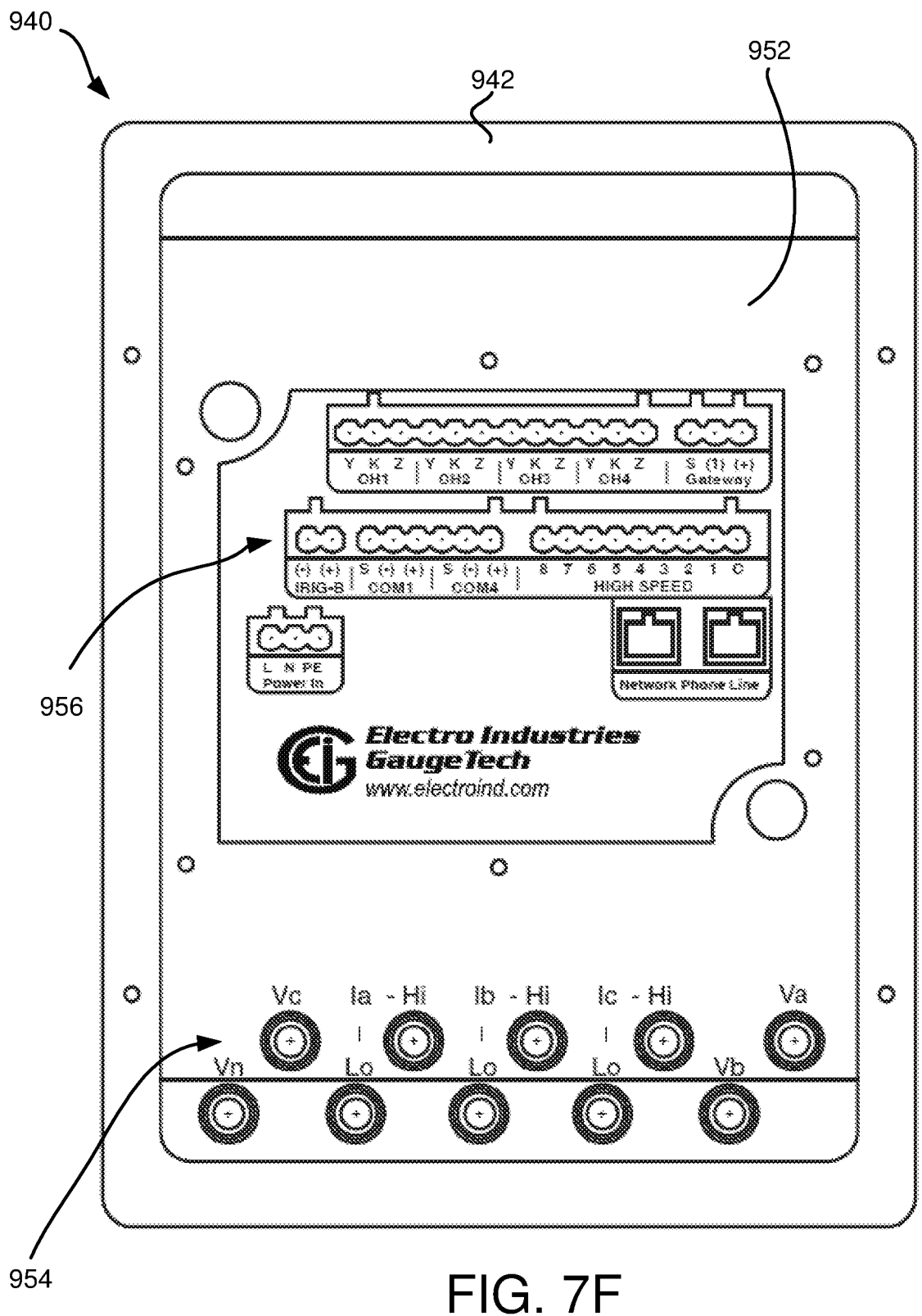

In a further embodiment, the IED 110, 200 may be disposed in a switchboard or draw-out type housing 940 as shown in FIGS. 7E and 7F, where FIG. 7E is a front view and FIG. 7F is a rear view. The switchboard enclosure 942 usually features a cover 944 with a transparent face 946 to allow the meter display 948 to be read and the user interface 950 to be interacted with by the user. The cover 944 also has a sealing mechanism (not shown) to prevent unauthorized access to the meter. A rear surface 952 of the switchboard enclosure 942 provides connections for voltage and current inputs 954 and for various communication interfaces 956. Although not shown, the meter disposed in the switchboard enclosure 942 may be mounted on a draw-out chassis which is removable from the switchboard enclosure 942. The draw-out chassis interconnects the meter electronics with the electrical circuit. The draw-out chassis contains electrical connections which mate with matching connectors 954, 956 disposed on the rear surface 952 of the enclosure 942 when the chassis is slid into place.

In yet another embodiment, the IED 110, 200 may be disposed in a A-base or type A housing as shown in FIGS. 7G and 7H. A-base meters 960 feature bottom connected terminals 962 on the bottom side of the meter housing 964. These terminals 962 are typically screw terminals for receiving the conductors of the electric circuit (not shown). A-base meters 960 further include a meter cover 966, meter body 968, a display 970 and input/output means 972. Further, the meter cover 966 includes an input/output interface 974. The cover 966 encloses the meter electronics 968 and the display 970. The cover 966 has a sealing mechanism (not shown) which prevents unauthorized tampering with the meter electronics.

It is to be appreciated that other housings and mounting schemes, e.g., circuit breaker mounted, are contemplated to be within the scope of the present disclosure.

It is to be appreciated that the various features shown and described are interchangeable, that is a feature shown in one embodiment may be incorporated into another embodiment.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. An intelligent electronic device (IED) comprising:
 a housing;
 at least one sensor disposed in the housing and coupled to at least one power line of an electrical power distribution system, and the at least one sensor configured for measuring at least one power parameter of the at least one power line and generating at least one analog signal indicative of the at least one power parameter;
 at least one analog to digital converter disposed in the housing and coupled to the at least one sensor configured for receiving the at least one analog signal and converting the at least one analog signal to at least one digital signal indicative of the at least one power parameter;
 at least one processor disposed in the housing, the at least one processor configured for receiving the at least one digital signal and calculating energy consumption in the at least one power line;
 a plurality of discrete resources stored in at least one memory disposed in the housing, the plurality of discrete resources including at least one statically generated resource including the at least one power parameter and the calculated energy consumption, the plurality of discrete resources further including at least one dynamically generated resource, the at least one dynamically generated resource generated by the at least one processor; and
 a web server disposed in the housing, the web server including a web services interface configured to access at least one of the dynamically generated resources in the at least one memory in response to a request from a client device, a file manager configured to access at least one of the statically generated resources in the at least one memory in response to a request from the client device, a server side processing engine configured to access at least one of the dynamically generated resources and/or the statically generated resources to generate a custom response to a request from the client device for one or more types of resources, and a router configured to receive the request,
 wherein the router is configured to directly route the request internally to the web services interface, the file manager and the server side processing engine disposed in the housing based on the type of resources requested in the request, wherein the router receives the response internally from one or more of the web services interface, file manager and/or the server side processing engine disposed in the housing and transmits the custom response to the client device, wherein the transmitted custom response includes a returned resource to the request, the returned resource including at least one script dynamically generated by the web server to be executed in the client device and configured to manipulate a web page in a web browser of the client device to display the at least one statically generated resource and/or at least one dynamically generated resource, the at least one statically generated resource and/or at least one dynamically generated resource being transmitted with the custom response.

2. The IED of claim 1, wherein the web services interface is a representational state transfer (REST) interface.

3. The IED of claim 2, wherein the request is a web address of a requested resource.

4. The IED of claim 1, wherein the web services interface is a simple object access protocol (SOAP) interface.

5. The IED of claim 4, wherein the request includes XML embedded in a body of a HTTP message.

6. The IED of claim 4, wherein the SOAP interface includes a web services description language (WSDL) file defining at least one interaction with a client device.

7. The IED of claim 4, wherein the request includes a format of data returned.

8. The IED of claim 4, wherein the SOAP interface includes a descriptor list associated with an address.

9. The IED of claim 1, wherein communication between the web server and client device is encrypted.

10. The IED of claim 9, wherein the encryption is at least one of a secure socket layer (SSL) and transport layer security (TLS).

11. The IED of claim 10, wherein the web server uploads an authentication certificate to the client device.

12. The IED of claim 11, wherein the web server requests the authentication certificate from the client device upon a request for access from the client device.

13. The IED of claim 10, wherein an authentication certificate is associated to at least one resource.

14. The IED of claim 1, wherein the web services strips out any unnecessary characters in a response to the request from the client device.

15. The IED of claim 1, wherein a second returned resource to the request is based on the logged in state of a user.

16. The IED of claim 1, wherein a second returned resource to the request is based on a configuration resource.

17. The IED of claim 16, wherein the configuration resource is a layout of a returned web page.

18. The IED of claim 17, wherein the layout is a user configured dashboard including a plurality of components selected by the user, a location and a type of each of the plurality of components being configured by the user.

19. The IED of claim 1, wherein a number of requests for resources is limited by a predetermined number of requests per second.

20. The IED of claim 1, wherein each request for a resource is associated with a weighting factor and each request is processed in order of the weighting factor from lowest to highest.

21. The IED of claim 1, wherein requests exceeding a predetermined number are cached in memory.

22. The IED of claim 1, wherein the at least one script determines at least one of the resources to request.

23. The IED of claim 1, wherein the at least one script manipulates a layout of a web page using the at least one requested resource.

24. The IED of claim 1, wherein the at least one script is based on a browser of the requesting client device.

25. The IED of claim 23, wherein the at least one requested resource is the at least one power parameter.

26. The IED of claim 23, wherein the at least one script generates a table from the at least one requested resource.

27. The IED of claim 23, wherein at least one script generates a graph from the at least one requested resource.

28. The IED of claim 18, wherein the user configured dashboard is configured external to the IED as a queryable file and uploaded to the at least one memory as a writeable resource.

29. The IED of claim 18, wherein the user configured dashboard is configured in the web browser of the client device using a script to manipulate at least one of a location and/or type of the plurality of components and stored in the at least one memory after the manipulation.

30. The IED of claim 1, wherein the at least one script dynamically loads at least one second script from dynamically generated resource addresses.

31. The IED of claim 1, wherein the at least one script is dynamically obfuscated on each request.

32. The IED of claim 1, wherein an order of variables and functions of the at least one script is dynamically rearranged on each request.

* * * * *